United States Patent Office 3,553,251
Patented Jan. 5, 1971

3,553,251
ALICYCLIC COMPOUNDS
Hartmut Hauth, Riehen, Dietrich Stauffacher, Reinach, Basel, Switzerland, assignors to Sandoz Ltd. (also known as Sandoz AG), Basel, Switzerland
No Drawing. Continuation-in-part of abandoned applications Ser. No. 446,698, Apr. 8, 1965, Ser. No. 535,005, Mar. 17, 1966, and Ser. No. 674,654, Oct. 11, 1967. This application Feb. 14, 1968, Ser. No. 705,297
Claims priority, application Switzerland, Apr. 17, 1964, 5,014/64; Mar. 5, 1965, 3,070/65, 3,071/65; Apr. 14, 1965, 5,265/65; Oct. 13, 1966, 14,791/66; Aug. 15, 1967, 11,437/67
Int. Cl. C07c 93/16, 69/74
U.S. Cl. 260—468.5
51 Claims

ABSTRACT OF THE DISCLOSURE

The compounds are of the class of mixtures of corresponding geometric isomers of 3-hydroxy-cassenic and isocassenic acid β-dimethylaminoethyl ester derivatives and also the separate geometric isomers 3β-hydroxy-14-desmethyl-cassenic and -isocassenic acid β(dimethylamino)ethyl ester. These compounds are useful as cariotonic agents with a positive inotropic effect. Important intermediates in the preparation of the compounds include 3-oxo- or 3β-acetoxy-14-desmethyl-cassenic and -isocassenic acid esters, which may be separated into the respective geometric isomers thereof by chromatography or fractional crystallization.

---

This is a continuation in part of our applications Ser. Nos. 446,698, 535,005 and 674,654 filed Apr. 8, 1965, Mar. 17, 1966 and Oct. 11, 1967, respectively all now abandoned.

The present invention relates to new alicyclic compounds and to their production.

The present invention particularly provides the compound of Formula Ia,

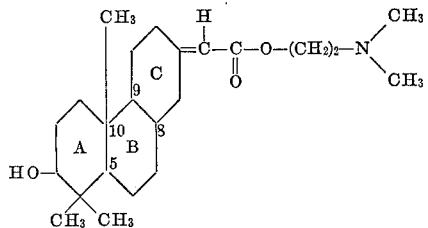

(Ia)

and the corresponding compound of Formula Ib,

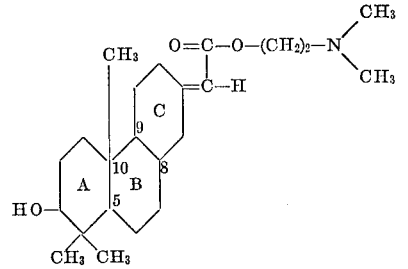

(Ib)

and their acid addition salts.

In Formula Ia, Ib and in the following formulae the rings A, B and C are joined together by a trans linkage, i.e. the methyl radical in the 10 position is in a trans position to the hydrogen atom in the 5 position, the two hydrogen atoms in the positions 8 and 9 are in a trans position to each other; the hydrogen atom in the 9 position is also in a trans position to the methyl radical in position 10. Furthermore, the hydroxyl radical or other monovalent radical in the 3 position is in the equatorial position.

In synthetic work in the field of cassenic acid derivatives, we have often produced a mixture of two corresponding geometric isomers of compounds representable by the Formula VI,

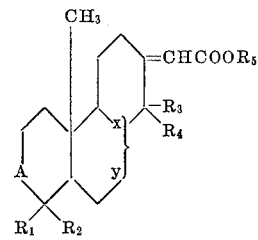

(VI)

in which A is

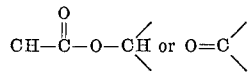

each of $R_1$, $R_2$, $R_3$ and $R_4$ is hydrogen or methyl,

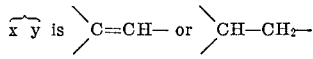

and $R_5$ is alkyl having 1 to 4 carbon atoms or phenyl or cyclohexyl.

For example, we have often produced a mixture of a compound of Formula IIa,

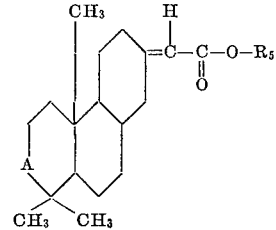

(IIa)

and the corresponding compound of Formula IIb,

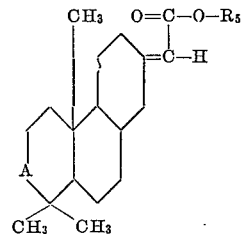

(IIb)

in which A and $R_5$ are as defined above,

We have now found that it is possible to separate from such a mixture the seqois isomer (Formula IIa) and the seqtrans isomer (Formula IIb). We have furthermore found that this separation opens up the route to novel compounds of pharmacological activity having a hydroxyl radical at the 3 position, especially the compound of Formula Ia or the compound of Formula Ib, optionally via compounds of Formula IIIa,

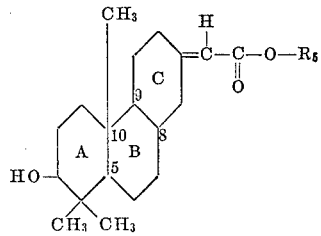

(IIIa)

or the corresponding compounds of Formula IIIb,

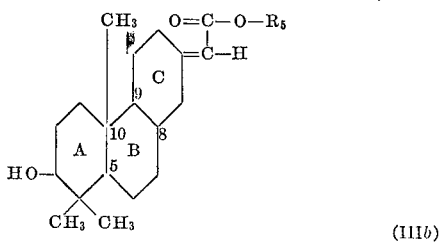

(IIIb)

in which $R_5$ has the above significance, respectively.

We have not been able to carry out the separation of the seqois and seqtrans isomers at a later stage, e.g. We have not found it possible to separate, from a mixture thereof, a compound of Formula IIIa from a corresponding compound of Formula IIIb, or to separate the compound of Formula Ia from the compound of Formula Ib in a mixture thereof.

The following should be noted with regard to the names of the compounds of Formulae Ia, Ib, IIa, IIb, IIIa, IIIb and VI:

As the known cassenic acid occurring in nature has the structure described in Formula IV,

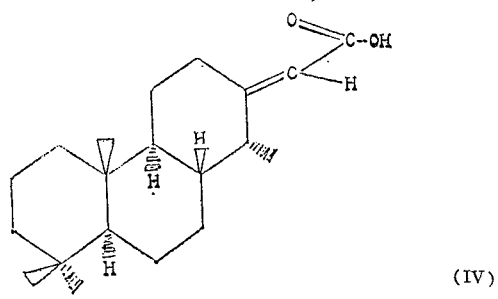

(IV)

its geometric isomer should be named isocassenic acid and has the Formula V,

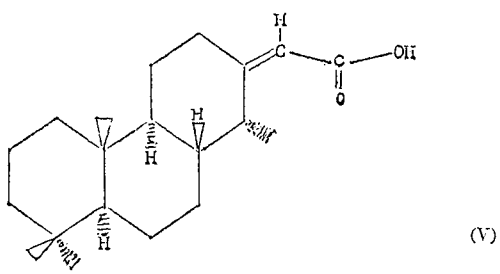

(V)

Based on this fact the seqtrans compounds are derived from cassenic acid and the seqois compounds from isocassenic acid.

Accordingly, the invention provides a method for the obtention of a compound of Formula IIa or IIb, characterized by subjecting a mixture of a compound of Formula IIa and its corresponding geometric isomer of Formula IIb to fractional crystallization and/or chromatography. The resulting compound of Formula IIa or IIb is obtained as a racemate.

For chromatography, nonpolar solvent mixtures, e.g. ether/petroleum ether, benzene/petroleum ether or benzene/ether, may be used, and the separation is preferably carried out on silica gel.

For fractional crystallization, nonpolar solvents or solvent mixtures, e.g. petroleum ether, ether, ether/petroleum ether, benzene/petroleum ether or benzene/ether, may be used.

We have found that compounds of Formula IIa or IIb, in which A signifies an O=C< radical and $R_5$ signifies an ethyl or tert.-butyl radical, may be particularly well obtained.

The separated compounds of general Formula IIa and IIb may be converted in accordance with the invention into the compound of Formula Ia or Ib, respectively, in one of the following manners:

A compound of general Formula IIa or IIb, in which A signifies the radical O=C<, may either be first reduced to a compound of general formula IIIa or IIIb, and an interchange of ester radicals with 2-dimethylamino-ethanol subsequently carried out to give the compound of Formula Ia or Ib, or may be first saponified, subsequently esterified with 2-dimethylamino-ethanol and then reduced to the compound of Formula Ia or Ib.

A compound of general Formula IIa or IIb, in which A signifies the radical

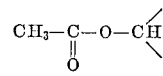

may either be first saponified to a compound of general Formula IIIa or IIIb and an interchange of ester radicals with 2-dimethylamino-ethanol subsequently carried out, or these two reactions may be effected simultaneously using a suitable catalyst.

The resulting compound of Formula Ia or Ib may then optionally be converted into an acid addition salt thereof by reaction with an organic or inorganic acid.

The above-indicated reduction of the 3-oxo compounds to the corresponding 3-hydroxy compounds of Formula IIIa or IIIb may advantageously be effected with sodium borohydride or potassium borohydride in an organic solvent which is inert under the reaction conditions, e.g. absolute methanol.

The subsequent ester interchange may, for example, be effected in the presence of a suitable basic catalyst, e.g. potassium hydroxide. The reaction is suitably effected as follows:

The 3β-hydroxy-14-desmethyl-cassenic or -isocassenic acid ester is dissolved in 2-dimethylamino-ethanol, pulverized potassium hydroxide is added and the mixture is stirred at room temperature for about 24 hours.

Alternatively, the ester interchange may be carried out using a pretreated, moist basic ion exchange resin, preferably having quaternary ammonium radicals. The pretreatment may be effected by stirring the moist ion exchange resin in the OH form first twice with methanol and then twice with 2-dimethylamino-ethanol. After each of these treatments the ion exchange resin is filtered off and again stirred in moist condition or used for the exchange of ester radicals in moist condition after the last filtering off.

The 3β-hydroxy-14-desmethyl-cassenic or -isocassenic acid ester is allowed to react at a temperature between +10° and +30° C. for several days while stirring, together with 2-dimethylamino-ethanol, in the presence of a basic ion exchange resin which has been pretreated as indicated above, with the addition of 50 to 120 cc. preferably 90 cc. of water for every mol of the ester used. The ion exchange resin is subsequently filtered off, the filtrate is dissolved in a water-immiscible solvent, e.g. ether, benzene or chloroform, and the organic solution is first washed with water and then extracted with an ice cooled aqueous solution of a strong inorganic acid. Before dissolving in an organic solvent the filtrate may be concentrated in a vacuum. The extract is made alkaline to phenolphthalein indicator while cooling with ice and the compound of Formula Ia or Ib precipitates.

The alternative method of obtaining the compound of Formula Ia or Ib from a compound of general Formula IIa or IIb, in which A signifies the radical C=C< is, as indicated above, via the corresponding free carboxylic acids. These are obtained from the racemic 3-oxo-14-desmethyl-cassenic or -isocassenic acid ester by saponification in manner known per se, e.g. with a methanolic-aqueous caustic potash solution. The hydrolysis of compounds of general Formulae IIa and IIb, in which A signifies the radical C=C< and R signifies —C(CH₃)₃, may be effected under particularly mild conditions, for example by treating with trifluoroacetic acid at room temperature.

The resulting free acid is converted into the corresponding acid chloride or acid bromide using, e.g., thionyl chloride in the presence of triethylamine or other suitable tertiary amine. This acid bromide or acid chloride is reacted in the presence of an acid-binding agent (e.g. a tertiary base such as triethylamine or an excess of the amino alcohol used for the exchange of ester radicals) with 2-dimethylamino-ethanol to form racemic 3-oxo-14-desmethyl-cassenic or -isocassenic acid β(dimethylamino)ethyl ester, which may be reduced with potassium borohydride or sodium borohydride as described above to give the compound of Formula Ia or Ib.

Where the starting materials are compounds of general Formula IIa or IIb in which A signifies the

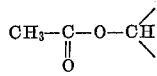

radical, the 3β-acetoxy-14-desmethyl-cassenic or -isocassenic acid ester may suitably be converted into 3β-hydroxy-14-desmethyl-cassenic or -isocassenic acid β(dimethylamino)ethyl ester by reacting with 2-dimethylamino-ethanol in the presence of an alkali metal hydroxide (e.g. potassium hydroxide) or metallic lithium.

The resulting compound of Formula Ia or Ib, which is obtained in the form of a racemate, may readily be isolated and purified by conventional techniques.

The compound of Formula Ia or Ib may be converted into an acid addition salt by reaction with a suitable organic or inorganic acid. Suitable acids include hydrochloric, hydrobromic, sulphuric, phosphoric, benzoic, acetic, maleic, p-toluenesulphonic and benzenesulphonic acids.

The invention also includes the preparation of the starting mixture of compounds of Formulae IIa and IIb, and the compounds of Formulae IIIa and IIIb, which are likewise obtained as racemates, described herein.

The invention also includes a particular group of compounds of Formula VI, namely a mixture of two corresponding geometric isomers chosen from compounds of Formula VII,

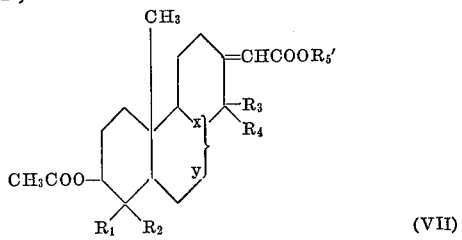

(VII)

wherein each of $R_1$, $R_2$, $R_3$ and $R_4$ is hydrogen or methyl,

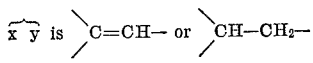

and $R_5'$ is alkyl of 1 to 4 carbon atoms.

The mixture of compounds VII, besides including certain mixtures of compounds IIa and IIb, used as hereinbefore described to obtain compounds Ia and Ib, may also be used to prepare mixtures of corresponding geometric isomers of compounds of Formula VIII,

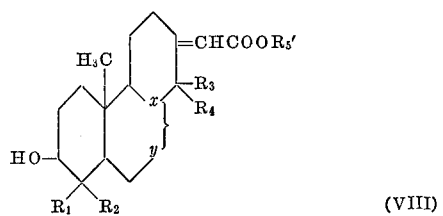

(VIII)

wherein each of $R_1$, $R_2$, $R_3$ and $R_4$ is hydrogen or methyl,

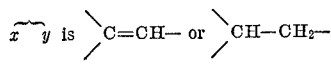

and $R_5'$ is alkyl of 1 to 4 carbon atoms.

The mixture of compounds VIII, besides including the mixtures of compounds IIIa and IIIb, used as hereinbefore described to obtain compounds Ia and Ib, may also be used to prepare mixtures of corresponding geometrical isomers of compounds of Formula IX.

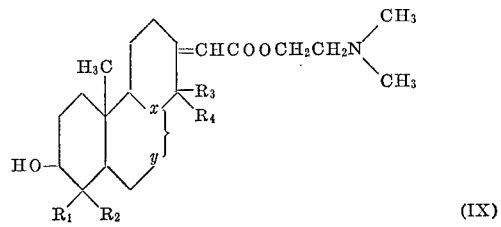

(IX)

wherein each of $R_1$, $R_2$, $R_3$ and $R_4$ is hydrogen or methyl, and

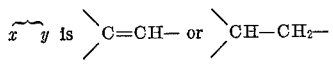

The mixtures of corresponding geometrical isomers of compounds of Formula IX may be prepared by a process characterized in that a mixture of corresponding geometrical isomers of compounds of Formula VIII is subjected to an interchange of ester radicals with 2-dimethylaminoethanol and the resulting mixture of the two geometric isomers of Formula IX is optionally converted into its acid addition salts in manner known per se.

As the esters of Formula VIII used as starting material have a semicyclic double bond which is easily affected by bases, rearrangements may be expected when using the common basic catalysts for the interchange of ester radicals. However, this interchange of ester radicals may successfully be effected with pretreated, moist, basic ion exchange resins. Basic ion exchange resins which may be used are especially those having quaternary ammonium radicals and the pretreatment consists in that the moist ion exchange resin in the OH form is consecutively stirred twice with methanol and then twice with 2-dimethylaminoethanol. After each of these treatments, the ion exchange resin is filtered off and is then stirred again in its moist state or is used in moist state for the interchange of ester radicals after the last filtration.

One advantageous method of effecting the process of the invention consists in that a mixture of corresponding geometric isomers of compounds of Formula VIII is reacted with 2-dimethylamino-ethanol in the presence of a pretreated basic ion exchange resin with the addition of 50–120 ml., preferably 90 ml. of water for every mol of compound II, for several days whilst stirring at a temperature between +10° and +30° C. The ion exchange resin is then filtered off, the filtrate is dissolved in a water immiscible solvent, e.g. ether, benzene and chloroform, and the organic solution is first washed with water and then extracted with an ice cooled aqueous solution of a strong inorganic acid. The filtrate may be concentrated in a vacuum before extraction with an organic solvent.

This extract is made alkaline to phenolphthalein indicator while cooling with ice and the precipitated desired mixture is purified in manner known per se, e.g. by crystallization, distillation at normal or reduced pressure or in a high vacuum or by chromatography, and is then optionally converted into its acid addition salts by reaction with an organic or inorganic acid.

The interchange of ester radicals may, however, in certain cases be effected with other suitable basic catalysts, e.g. potassium hydroxide or lithium. Thus, for example, it is possible to obtain 3-hydroxy-14-desmethyl-cassenic and -isocassenic acid β-dimethylaminoethyl ester by the interchange of ester radicals of 3-hydroxy-14-desmethyl-cassenic and -isocassenic acid methyl ester or 3-acetoxy-14-desmethyl-cassenic or-isocassenic acid ethyl ester with 2- dimethylamino-ethanol in the presence of potassium hydroxide or lithium.

The new mixtures of corresponding geometric isomers of compounds of Formula IX are basic compounds which are oily or crystalline at room temperature; with organic or inorganic acids they form acid addition salts which are crystalline at room temperature. Examples of acids for acid addition salt formation are: hydrochloric, hydrobromic, sulphuric, fumaric, maleic, tartaric and methanesulphonic acid.

The starting mixtures of corresponding geometric isomers of compounds of Formula VIII may be prepared by partial saponification in a manner known per se, preferably with a methanolic or ethanolic caustic potash solution, of mixtures of corresponding geometric isomers of compounds of Formula VII.

The mixtures of corresponding geometric isomers of compounds of Formula VII may be obtained by reaction of a compound of Formula X,

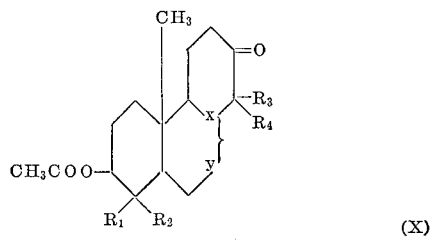

in which $R_1$ to $R_4$ and

have the above significance, with an alkoxy-acetylene having from 1 to 4 carbon atoms in the alkyl radical, in the presence of boron trifluoride and of an inert organic solvent, the alkoxy-acetylene being added portionwise to the cyclic ketone and boron trifluoride at such a rate that the temperature of the reaction mixture does not exceed 20° C., and the reaction being continued, after this initial admixture, at a temperature from 0° C. to the boiling temperature of the solution, e.g. approximately 100° C.

Desirably the boron trifluoride is present as an etherate, e.g. the di-ethyl etherate. After the initial admixture of the reactants, the reaction is preferably continued at the boiling temperature of the organic solvent used, suitable solvents including absolute ether, absolute benzene, absolute dioxane and absolute 1,2-dimethoxy-ethane. If desired, subsequent to the initial admixture of the reactants and continuation of the reaction at a temperature of from 0° C. to approximately 100° C., further alkoxy-acetylene may be added as indicated below.

It is advantageous to use 1.5 to 3 mols of a lower alkoxy-acetylene for every mol of compound X. The process is effected, for example, in that 1 to 1.5 mols of boron trifluoride ethyl-etherate are first added to a solution of 1 mol of compound X in an inert anhydrous organic solvent and then a solution of 1 to 1.5 mols of a lower alkoxy-acetylene, in the same solvent or in some other inert anhydrous organic solvent is added whilst stirring at such a rate that the temperature of the reaction mixture does not rise above 20° C. Stirring is then effected for several hours at a temperature between 0° C. and the boiling temperature of the organic solvent and subsequently a further 0.5 to 1.5 mols of the lower alkoxy-acetylene are added whilst stirring.

After the reaction has been completed, the mixture is cooled to approximately 0° C., the resulting reaction complex is hydrolyzed and the final product is extracted, e.g. with ether, benzene or chloroform. The product is isolated from the resulting solution in manner known per se and is subsequently purified, e.g. by distillation at reduced pressure, crystallization or chromatography.

It is known that α,β-unsaturated alkyl esters may be obtained by reacting alicyclic carbonyl compounds with alkoxy-acetylene in the presence of a Lewis acid at a temperature below 0° C. On using certain sterically hindered alicyclic carbonyl compounds as starting materials, however, only small yields, of no technical value, are obtained in accordance with this process. An increase of the reaction temperature did not seem to be possible since at high temperatures a polymerization of the acetylene compound under the influence of the Lewis acid could be expected. Surprisingly it has now been found that the alicyclic, sterically hindered mixtures of corresponding geometric isomers of compounds of formula VII may in fact be obtained in a very good yield under the conditions indicated above.

The fundamental starting materials, 1,4,4a,4b,5,6,7,8,8a,9,10,10a-dodecahydro-4b,8,8-trimethyl - 7β - hydroxy-2(3H)phenanthrone and the corresponding 7β-acetoxy compound, whose preparation is described in the examples, also form part of the present invention.

The compounds of Formulae Ia and Ib and the mixtures of corresponding geometric isomers of compounds of Formula IX are useful because they possess pharmacological activity in animals. In particular, they are useful as cardiotonic agents with a positive inotropic effect as indicated by the isolated insufficient heart test (Von. M. Emmeneggerm et al. Helv. Physiol. Acta 20, 213–226 (1962)) in the cat.

For the above-mentioned use, the dosage administered will, of course, vary depending on the compound employed, mode of administration and treatment desired. However, in general satisfactory results are obtained when the compounds are administered by intramuscular injection at the daily dosages indicated below, preferably in divided doses 2–3 times a day:

Mixtures of corresponding geometrical isomers of compounds of Formula IX: About 3 to about 30 micrograms per kilogram of cat body weight.
Compound Ia: About 6 to about 60 micrograms per kilogram of cat body weight.
Compound Ib: About 3 to about 30 micrograms per kilogram of cat body weight.

For the larger mammals, the total daily dosages are in the ranges given below:

Mixtures of corresponding geometrical isomers of compounds of Formula IX: About 200 to about 2000 micrograms.
Compound Ia: About 400 to about 4000 micrograms.
Compound Ib: About 200 to about 2000 micrograms.

Dosage forms suitable for administration orally or by intramuscular injection to the larger mammals comprise the amounts of the compounds given below:

Mixtures of corresponding geometrical isomers of compounds of Formula IX: About 65 to about 1000 micrograms.
Compound Ia: About 130 to about 2000 micrograms.
Compound Ib: About 65 to about 1000 micrograms.

It is to be noted that compound Ib, besides being more active than compound Ia, also has a longer duration of action. It will also be appreciated that the compounds can be used and administered in the same way as the known drug strophanthin. The dosages are of the same order as, but slightly higher than are required with strophanthin.

For such uses, the compounds may be combined in conventional manner with a physiologically acceptable carrier, and such other adjuvants as may be desirable, for oral administration in the form of a tablet, dragée, syrup or the like or for intramuscular injection in the form of an injectable solution or suspension. Furthermore, the compounds may similarly be administered in the form of their physiologically acceptable acid addition salts, which possess the same order of activity as the free base.

Examples of suitable carriers are:

For tablets and dragées: lactose, starch, talc and stearic acid;
For syrups: solutions of cane sugar, invert sugar and glucose;
For injectable solutions: water, alcohols, glycerin and vegetable oils.

The preparations may furthermore contain suitable preserving, stabilizing and wetting agents, solubilizers, sweetening and colouring substances and flavourings.

The term "in manner known per se" as used herein designates methods in use or described in the literature on the subject.

In the following non-limitative examples all temperatures are indicated in degrees centigrade. The melting points are uncorrected.

The UV spectra were taken in ethanol, the IR spectra in methylene chloride, and the NMR spectra with $CDCL_3$ as solvent. The position of the NMR signals is indicated in $\delta$ (p.p.m.), tetramethylsilane ($\delta_{TMS}=0$) being used as reference substance. The numbers of hydrogen atoms indicated in the NMR data were ascertained by electronic integration.

Thin layer chromatography was effected on silica gel layer. Methylene chloride/methanol was used as eluant. The spots were made visible by vaporizing with iodine and/or by spraying with $KMnO_4$ solution.

Where the heading compound of an example is qualified by the indication "(I.M.)," it, and where appropriate intermediate compounds in the example, is actually a mixture of the corresponding cassenic and isocassenic acid geometric isomers, regardless of the fact that it may be named simply as a cassenic acid derivative.

EXAMPLE 1

Separation of the mixture of racemic 3-oxo-14-desmethyl-cassenic acid ethyl ester with racemic 3-oxo-14-desmethyl-isocassenic acid ethyl ester 69.0 g. of the mixture of the geometric isomers of 3-oxo-14-desmethyl-cassenic acid ethyl ester and the corresponding iso compound are chromatographed on 2 kg. of silica gel. Elution with 16 liters of petroleum ether or 16 liters of a mixture of petroluem ether/ether (95:5) yields small amounts of impurities which are discarded. Further elution with a mixture of petroleum ether/ether (9:1) yields a crystalline product in the first 8 fractions (fractions a–h) of 2 liters each, which is uniform in accordance with thin layer chromatography. Upon crystallization from ether/petroleum ether these combined fractions (a–h) yield colourless crystals having a M.P. of 93–97°.

Further amounts of material, having a M.P. of 93–97°, may be isolated by repeated chromatography of the mixed fractions and mother liquors.

After taking up in a small amount of ether and precipitating with petroleum ether colourless prisms having a M.P. of 96–98° are obtained. This geometric isomer, i.e. racemic 3-oxo-14-desmethyl-isocassenic acid ethyl ester, is further characterized by the following physical constants:

UV spectrum:
Maximum at 222.5 nm. (log $\epsilon=4.22$)
Shoulder at 300 nm. (log $\epsilon=1.38$)

IR spectrum:
Inter alia bands at 1708, 1702 and 1648 cm.$^{-1}$

NMR spectrum: Inter alia signals at—
0.98, 1.05, 1.08 p.p.m. singlets for C—$CH_3$ (3 H each)
1.27 p.p.m. triplet and 4.17 p.p.m. quadruplet for —$COOCH_2CH_3$
3.8 p.p.m. multiplet for $C_{14}$—H (1 H)
5.62 p.p.m. wide singlet for C=C—H (1 H).

Upon continuing elution with a mixture of petroleum ether/ether (9:1) the following 12 fractions (h–t) of 2 liters each contain compound mixtures, whereas the following fractions (u and following) again yield uniform compound with the same solvent. The combined fractions (u and following) crystallize from ether/petroleum ether and yield colourless crystals having a M.P. of 80–82°.

A further amount of compound having a M.P. of 80–82° may be isolated by repeated chromatography of the mixed fractions and mother liquors.

After recrystallizing from ether/petroleum ether the resulting colourless prisms have a M.P. of 81–82°. This geometric isomer, i.e. racemic 3-oxo-14-desmethyl-cassenic acid ethyl ester, is further characterized by the following physical constants:

UV spectrum:
Maximum at 222 nm. (log $\epsilon=4.22$)
Shoulder at 300 mm. (logic $\epsilon=1.37$)

IR spectrum:
Inter alia bands at 1705, 1700 and 1648 cm.$^{-1}$

NMR spectrum: inter alia signals at—
0.98, 1.05, 1.08 p.p.m. singlets for C—$CH_3$ (3 H each)
1.27 p.p.m. triplet and 4.17 p.p.m. quadruplet for —$COOCH_2CH_3$
3.9 p.p.m. multiplet for $C_{12}$—H (1 H)
5.62 p.p.m. wide singlet for C=C—H (1 H).

The mixture of racemic 3-oxo-14-desmethyl-cassenic acid ethyl ester and racemic 3-oxo-14-desmethyl-isocassenic acid ethyl ester used as starting material may be produced as follows:

(a) 2,7 - dixo - 1,1,4a-trimethyl-perhydro-phenanthrene trans-anti-trans)

14.8 g. (2.13 mols) of lithium are added portionwise to 4 liters of liquid ammonia while stirring and passing through a stream of nitrogen and in the absence of moisture. The dark blue solution is cooled to —50° and a solution of 70 g. (0.267 mols of 4,4a,4b,5,6,7,8,8a,9,10-decahydro-7β-hydroxy-4b,8,8-trimethyl-2(3H)-phenanthrone in 1.6 liters of absolute tetrahydrofuran is then immediately allowed to flow into the solution. After stirring at —50° for 3 hours 120 g. of ammonium chloride are added and the ammonia is distilled off overnight from the colourless reaction mixture. The resulting residue is concentrated in a vacuum and extracted with methylene chloride. The organic phase is purified by washing with a 2 N sodium bicarbonate solution and water, is dried and concentrated in a vacuum.

The resulting dark brown viscous oil is dissolved in 550 cc. of glacial acetic acid, 265 cc. of a 10% solution of chromium trioxide in 90% acetic acid is added while cooling with ice, and the mixture is allowed to stand overnight at room temperature. After the addition of a small amount of ethanol concentration is effected in a vacuum, the residue is taken up in ether, the ether solution is washed with saturated aqueous sodium bicarbonate solution, is dried and concentrated. Crystallization of the residue from acetone yields 2,7-dioxo-1,1,4a-trimethyl-perhydrophenanthrene in the form of colourless prisms having a M.P. of 130–132°.

A further amount of 2,7-dioxo-1,1,4a-trimethyl-perhydrophenanthrene may be obtained from the mother liquor by chromatography on silica gel and elution with a mixture of petroleum ether/ether (7:3).

UV spectrum: Maximum at 286 nm. (log $\epsilon=1.64$)
IR spectrum: inter alia bands at 1710 cm.$^{-1}$
NMR spectrum: Inter alia signals at 1.03, 1.07, 1.11 p.p.m. singlets for C—$CH_3$ (9 H).

The 1,4,4a,4b,5,6,7,8,8a,9,10,10a - dodecahydo-7β-hydroxy - 4b,8,8-trimethyl-2(3H)-phenanthrone (trans-anti-trans) obtained as intermediate may be chromatographed on silica gel for purification, whereby a colourless oil is eluted with a mixture of ether/petroleum ether (1:1) this oil crystallizes from acetone/ether in the form of colourless needle druses having a M.P. of 117–120°.

NMR spectrum: Inter alia signals at—
    0.83, 0.87, 1.02 p.p.m. singlets for C—CH$_3$ (3 H each)
    About 3.1–3.6 p.p.m. multiples for CH—OH (1 H)

(b) Mixture of racemic 3-oxo-14-desmethyl-cassenic acid ethyl ester with racemic 3-oxo-14-desmethyl-isocassenic acid ethyl ester

[α] With ethoxy-acetylene.—2.13 g. (15 millimols) of freshly distilled boron trifluoride ethyl-etherate and subsequently 1.05 g. (15 millimols) of ethoxy-acetylene in 10 cc. of absolute ether are added to a solution of 3.93 g. (15 millimols) of 2,7 - dioxo-1,1,4a-trimethyl-perhydrophenanthrene (trans-anti-trans) in 100 cc. of absolute ether while cooling with ice and in the absence of moisture. After the addition has been completed stirring is effected at room temperature for 30 minutes and then at reflux for 1½ hours, cooling is again effected to 0°, ice water is added and extraction is effected with methylene chloride. The organic phase is washed with a 20% sodium acetate solution and water, dried and concentrated. Subsequent chromatography of the crude product on silica gel yields a mixture of the two compounds indicated in the heading after elution with petroleum ether/ether (9:1).

[β] With phosphonoacetic acid triethyl ester.—A solution of 67.3 g. (0.3 mol) of phosphonoacetic acid triethyl ester in 400 cc. of absolute dimethylformamide is added dropwise to a suspension of 6.9 g. (0.29 mol) of sodium hydride in 250 cc. of absolute dimethylformamide in the absence of moisture and while passing through a stream of nitrogen, at such a rate that the reaction temperature does not rise above 20°. After the addition has been completed stirring is effected at room temperature for 30 minutes and subsequently a solution of 52.5 g. (0.2 mol) of 2,7-dioxo-1,1,4-trimethyl-perhydro-phenanthrene (trans-anti-trans) in 400 cc. of absolute dimethylformamide is added dropwise to the clear yellow reaction mixture at room temperature in the course of 45 minutes. After stirring for 2½ hours at room temperature, 100 cc. of ice water are added to the reaction product and thorough extraction is effected with a mixture of ether/petroleum ether (1:1). The organic phase is successively washed with 2 N hydrochloric acid, water, saturated sodium bicarbonate solution and again water, is dried and concentrated. A yellowish brown oil, containing the two compouns indicated in the heading, is obtained as residue.

(c) Mixture of racemic 3-oxo-14-desmethyl-cassenic acid ethyl ester with racemic 3-oxo-14-desmethyl-isocassenic acid ethyl ester

[α] Mixture: racemic 3β-hydroxy-14-desmethyl-cassenic acid ethyl ester with racemic 3β-hydroxy-14-desmethyl-isocassenic acid ethyl ester.—A mixture of 16.8 g. (75 millimols) of phosphonoacetic acid triethyl ester and 200 cc. of absolute dimethylformamide is added dropwise at 0° during the course of 30 minutes to a suspension of 1.8 g. (75 millimols) of sodium hydride in 150 cc. of absolute dimethylformamide in the absence of moisture and while passing through a stream of nitrogen. After the addition has been completed stirring is effected at room temperature for a further 30 minutes and a solution of 13.2 g. (50 millimols) of 1,4,4a,4b,5,6,7,8,8a,9,10,10a-dodecahydro - 4b,8,8 - trimethyl - 7β - hydroxy - 2(3H)-phenanthrone (trans-anti-trans) in 200 cc. of absolute dimethylformamide is subsequently added dropwise to the yellowish, clear reaction mixture during the course of 30 minutes. The reaction is completed by stirring at room temperature overnight, subsequently adding ice water and extracting with ether/petroleum ether (1:1). The organic phase is successively washed with 2 N hydrochloric acid, water, saturated sodium bicarbonate solution and saturated sodium chloride solution, is dried and concentrated, whereby a yellowish oil is obtaine as residue. After crystallization from petroleum ether this oil yields crystals having a M.P. of 86–95°.

For further purification the mother liquor is chromatographed on a 50-fold quantity of silica gel and after elution with petroleum ether/ether (75:25) and subsequent crystallization from petroleum ether a further amount of crystalline product having a M.P. of 86–95° is obtained. After recrystallization from ether/petroleum ether a mixture of racemic 3β-hydroxy-14-desmethyl-cassenic acid ethyl ester and racemic 3β-hydroxy-14-desmethyl-isocassenic acid ethyl ester is obtained in the form of colourless crystals having a M.P. of 92–103°.

UV spectrum: Maximum at 223 nm. (log ϵ=4.22)
IR spectrum: Inter alia bands at—
    3620 cm.$^{-1}$ (OH)
    1705 cm.$^{-1}$ (α,β-unsaturated ester)
    1647 cm.$^{-1}$ (conjugation C=C)
NMR spectrum: Inter alia signals at—
    0.80 p.p.m. singlet for C—CH$_3$ (6 H)
    1.00 p.p.m. singlet for C—CH$_3$ (3 H)
    1.27 p.p.m. triplet for —CH$_2$—CH$_3$
    About 3.1–3.5 p.p.m. multiplet for CH—OH (1 H)
    About 3.6–4.1 p.p.m. multiplet for C—H (1 H)
    4.17 p.p.m. quadruplet for —CH$_2$—CH$_3$ (2 H)
    5.60 p.p.m. singlet for C=C—H (1 H).

[β] Mixture of racemic 3-oxo-14-desmethyl-cassenic acid ethyl ester with racemic 3-oxo-14-desmethyl-isocassenic acid ethyl ester.—A 10% solution of chromium trioxide in 90% glacial acetic acid is added during the course of 10 minutes to a solution of 5 g. (15 millimols) of a mixture of racemic 3β-hydroxy-14-desmethyl-cassenic acid ethyl ester with racemic 3β-hydroxy-14-desmethyl-isocassenic acid ethyl ester in 50 cc. of glacial acetic acid, and the red solution is allowed to stand at room temperature. After 1½ hours the green reaction mixture is concentrated in a vacuum, the residue is taken up in methylene chloride, is successively washed with water, a saturated sodium bicarbonate solution and a saturated sodium chloride solution, is dried and concentrated. A yellow oil, containing a mixture of racemic 3-oxo-14-desmethyl-cassenic acid ethyl ester and racemic 3-oxo-14-desmethyl-isocassenic acid ethyl ester, is obtained as residue.

EXAMPLE 2a

Racemic 3β-hydroxy-14-desmethyl-isocassenic acid ethyl ester 246 mg. (6.25 millimols) of sodium borohydride are added in 2 portions to a solution of 1.66 g. (5 millimols) of racemic 3-oxo-14-desmethyl-isocassenic acid ethyl ester in 30 cc. of absolute methanol at room temperature, whereby gas evolution and a slight rise in temperature occur. After stirring at room temperature for 4 hours 10 cc. of ice water are added, concentration is effected in a vacuum and the residue is extracted with methylene chloride. The organic phase is washed with 2 N hydrochloric acid, water, a saturated sodium bicarbonate solution and again water and is dried. After removing the solvent a yellowish oil is obtained; after crystallizing twice from ether/petroleum ether this oil yields racemic 3β-hydroxy-14-desmethyl-isocassenic acid ethyl ester in the form of colourless prisms having a M.P. of 102–103°.

UV spectrum: Maximum at 222.5 nm. (log ϵ=4.23)
IR spectrum: Inter alia bands at 3620, 1708 and 1648 cm.$^{-1}$
NMR spectrum: Inter alia signals at—
    0.80, 0.98 p.p.m. singlets for C—CH$_3$ (6 or 3 H)
    1.27 p.p.m. triplet and 4.17 p.p.m. quadruplet for —COOCH$_2$CH$_3$
    3.0–3.4 p.p.m. multiplet for CH—OH (1 H)
    3.8 p.p.m. multiplet for C$_{14}$—H (1 H)
    5.62 p.p.m. wide singlet for C=C—H (1 H).

EXAMPLE 2b

Racemic 7-desoxo-14-desmethyl-isocassaine [racemic 3β-hydroxy-14-desmethyl - isocassenic acid β(dimethylamino)ethyl ester]

4.0 g. 12 millimols) of racemic 3β-hydroxy-14-desmethyl-isocassenic acid ethyl ester are dissolved in 100 cc. of 2-dimethylamino-ethanol, 335 mg. (6 millimols) of pulverized potassium hydroxide are added and the mixture is stirred over night at room temperature. After concentrating the reaction solution in a high vacuum the residue is taken up in ether and the solution is successively washed with water, thrice with ice-cooled 2 N hydrochloric acid and again with water. The combined aqueous-hydrochloric acid extracts are made ammoniacal while cooling with ice and are thoroughly extracted with methylene chloride. After washing with water, drying and concentrating the organic phase a colourless oil, rac. 7-desoxo-14-desmethyl-isocassaine, UV spcetrum: Maximum at 223.5 nm. (log $\epsilon$=4.25)
IR spectrum: Inter alia bands at 3610, 2770, 1708, 1648 cm.$^{-1}$
NMR spectrum: Inter alia signals at—
  0.79, 0.98 p.p.m. singlets for C—CH$_3$ (6 or 3 H)
  230 p.p.m. singlet for N(CH$_3$)$_2$ (6 H)
  2.60, 4.22 p.p.m. triplets for —OCH$_2$CH$_2$N— (2 H each)
  about 3.1–3.5 p.p.m. multiplet for CH—OH (1 H)
  about 3.8 p.p.m. multiplet for C$_{14}$—H (1 H)
  5.65 p.p.m. wide singlet for C=C—H (1 H)

Hydrochloride: After recrystallizing twice from methanol/acetone colourless leaflets having a M.P. of 235–238° are obtained. UV spectrum: maximum at 227 nm. (log $\epsilon$=4.26).

EXAMPLE 3a

Racemic 3β-hydroxy-14-desmethyl-cassenic acid ethyl ester 246 mg. (6.25 millimoles) of sodium borohydride are added in 2 portions at room temperature to a solution of 1.66 g. (5 millimols) of racemic 3-oxo-14-desmethyl-cassenic acid ethyl ester in 30 cc. of absolute methanol, whereby gas evolution and a slight rise of temperature occur. After stirring at room temperature for 3 hours 10 cc. of ice water are added, concentration is effected in a vacuum and the residue is extracted with methylene chloride. The organic phase is washed with 2 N hydrochloric acid, water, saturated sodium bicarbonate solution and again water and is dried. After removing the solvent an oil, racemic 3β-hydroxy-14-desmethyl-cassenic acid ethyl ester, is obtained; after crystallizing twice from ether/petroleum ether this oil yields colourless prisms having a M.P. of 117–118°.

UV spectrum: Maximum at 222 nm. (log $\epsilon$=4.26)
IR spectrum: Inter alia bands at 3600, 1708 and 1648 cm.$^{-1}$
NMR spectrum: Inter alia signals at—
  0.80, 0.98 p.p.m. singlets for C—CH$_3$ (6 or 3 H)
  127 p.p.m. triplet and 4.15 p.p.m. quadruplet for —COOCH$_2$CH$_3$
  3.0–3.5 p.p.m. multiplet for CH—OH (1 H)
  3.9 p.p.m. multiplet for C$_{12}$—H (1 H)
  5.6 p.p.m. wide singlet for C=C—H (1 H).

EXAMPLE 3b

Racemic 7-desoxo-14-desmethyl-cassaine [racemic 3β-hydroxy-14 - desmethyl-cassenic acid β(dimethylamino) ethyl ester]

8.0 g. (24 millimols) of racemic 3β-hydroxy-14-desmethyl-cassenic acid ethyl ester are dissolved in 150 cc. of 2-dimethylaminoethanol, 670 mg. (12 millimols) of pulverized potassium hydroxide are added and the mixture is stirred overnight at room temperature. The pale yellow reaction solution is carefully concentrated in a high vacuum and the residue is taken up in ether. The ether solution is washed with water and extracted thrice with ice-cooled 2 N hydrochloric acid. The aqueous-hydrochloric acid extract is made alkaline with ammonia, is thoroughly extracted with methylene chloride and the organic phase is dried and concentrated.

A yellowish oil is isolated from the hydrochloric acid extract; after crystallizing twice from acetone/ether and drying at 60° this oil yields colourless crystals of racemic 7-desoxo-14-desmethyl-cassaine, having a M.P. of 112–113°.

UV spectrum: Maximum at 223.5 nm. (log $\epsilon$=4.23)
IR spectrum: Inter alia bands at 3610, 2780, 1710 and 1650 cm.$^{-1}$
NMR spectrum: Inter alia signals at—
  0.80, 0.98 p.p.m. singlets for C—CH$_3$ (6 or 3 H)
  2.30 p.p.m. singlet for —N(CH$_3$)$_2$ (6 H)
  2.60, 4.20 p.p.m. triplets for —OCH$_2$CH$_2$N— (2 H each)
  About 3.0–3.5 p.p.m. multiplet for —CH—OH (1 H)
  About 3.9 p.p.m. multiplet for —C$_{12}$—H (1 H)
  5.64 p.p.m. wide signal for C=C—H (1 H).

Hydrochloride: After recrystallizing twice from methanol/acetone colourless prisms having a M.P. of 225–227° are obtained.

EXAMPLE 3c

Racemic 7-desoxo-14-desmethyl-cassaine 0.8 g. (2.4 millimols) of racemic 3β-hydroxy-14-desmethyl-cassenic acid ethyl ester are dissolved in 15 cc. of 2-dimethylamino-ethanol and 33 mg. (4.8 millimols) of lithium are added. After stirring for 2 days in an atmosphere of nitrogen, working up is effected in a manner analagous to that described in Example 3b, whereby racemic 7-desoxo-14-desmethyl-cassaine is obtained.

EXAMPLE 4

Racemic 7-desoxo-14-desmethyl-cassaine (a) Racemic 3-oxo-14-desmethyl-cassenic acid.—A hot solution of 100 g. of potassium carbonate in 300 cc. of water is added to a hot solution of 19.9 g. of racemic 3-oxo-14-desmethyl-cassenic acid ethyl ester in 300 cc. of methanol and heating at reflux is effected. After 5 hours cooling in effected, the methol is removed in a vacuum, the residue is made alkaline with 2 N ammonium hydroxide and extraction is effected with ether. The ether extracts are again washed with 2 N ammonium hydroxide.

The combined aqueous-alkaline phases are acidified while cooling with ice and are thoroughly extracted with methylene chloride. After washing, drying and concentrating the organic phase racemic 3-oxo-14-desmethyl-cassenic acid crystallizes from acetone in small colourless needles having a M.P. of 218–220°.

UV spectrum:
  Maximum at 221 nm. (log $\epsilon$=4.18)
  Shoulder at 300 nm. ((log $\epsilon$=1.33)
IR spectrum: Inter alia bands at 3500, 1690, 1640 cm.$^{-1}$
NMR spectrum: Inter alia signals at—
  0.98, 1.05, 1.08 p.p.m. singlets for C—CH$_3$ (9 H)
  3.9 p.p.m. multiplet for C$_{12}$—H (1 H)
  5.67 p.p.m. wide singlet for C=C—H
  9.2–10.3 p.p.m. wide signal for —COOH (1 H)

(b) Racemic 3-dehydro-7-desoxo - 14 - desmethyl-cassaine.—6.12 cc. (44 millimols) of triethylamine are added in the absence of moisture to a suspension of 12.16 g. (40 millimols) of racemic 3-oxo-14-desmethyl-cassenic acid in 260 cc. of absolute benzene, the clear solution is cooled with an ice bath and 3.11 cc. (44 millimols) of thionyl chloride in 40 cc. of absolute benzene are added while stirring. After stirring at room temperature for 1½ hours cooling is again effected with an ice bath and a solution of 8.96 g. (100 millimols) of 2-dimethylamino-ethanol and 6.12 cc. (44 millimols) of triethylamine in 60 cc. of absolute benzene is added dropwise to the reaction mixture. After stirring at room temperature for a further two hours 20 cc. of ice water are added to the reaction mixture and thorough extraction is effected with 2 N hydrochloric acid.

The combined aqueous-hydrochloric acid extracts are made ammoniacal while cooling with ice and are thoroughly extracted with methylene chloride. After washing with water, drying and concentrating the extract racemic 3 - dehydro - 7-desoxo-14-desmethyl-cassaine crystallizes from ether/petroleum ether in colourless prisms having a M.P. of 114–116°.

UV spectrum:
 Maximum at 223.5 nm. (log $\epsilon=4.27$)
 Shoulder at 295 nm. (log $\epsilon=1.39$)
IR spectrum: Inter alia bands at 1700, 1648 cm.$^{-1}$
NMR spectrum: Inter alia signals at—
 0.97, 1.05, 1.08 p.p.m. singlets for C—$CM_3$ (9 H)
 2.30 p.p.m. singlet for $N(CH_3)_2$ (6 H)
 2.58, 4.20 p.p.m. triplets for O—$CH_2CH_2$—N (2 H each)
 3.9 p.p.m. multiplet for $C_{12}$—H (1 H)
 5.67 p.p.m. wide singlet for C=C—H (1 H)

(c) Racemic 7-desoxo-14-desmethyl-cassaine.—1.51 g. (40 millimols) of sodium borohydride are added portionwise at +5° to a solution of 12 g. (32 millimols) of racemic 3-dehydro-7-desoxo-14-desmethyl-cassaine in 100 cc. of absolute methanol. After standing at +5° for 45 minutes a small amount of ice water is added, the methanol is removed in a vacuum and the residue is thoroughly extracted with methylene chloride. After washing the organic phase with water, drying and concentrating the residue crystallizes from ether in colourless crystals having a M.P. of 111–113°. The spectroscopic data of this compound agree with those of the compound obtained in accordance with Example 3b.

EXAMPLE 5

Racemic 7-desoxo-14-desmethyl-isocassaine

Racemic 7 - desoxo-14-desmethyl-isocassaine may be produced from racemic 3-oxo-14-desmethyl-isocassenic acid ethyl ester, via the stages racemic 3-oxo-14-desmethyl-isocassenic acid and racemic 3-dehydro-7-desoxo-14-desmethyl-isocassaine, in accordance with the process described in steps 4a, 4b and 4c. The spectroscopic data of this compound agree with those of the compound obtained in accordance with Example 2b.

The corresponding intermediates are characterized by the following physical constants:

Rac. 3-oxo-14-desmethyl-isocassenic acid:
 M.P. 226–230° (from methylene chloride/acetone)
 UV spectrum:
  Maximum at 221 nm. (log $\epsilon=4.17$)
  Shoulder at 300 nm. (log $\epsilon=1.26$)
 IR spectrum: Inter alia bands at 3500, 1690, 1640 cm.$^{-1}$
 NMR spectrum: Inter alia signals at—
  0.98, 1.05, 1.08 p.p.m. singlets for C—$CH_3$ (9 H)
  About 3.8 p.p.m. multiplet for $C_{14}$—H (1 H)
  5.65 p.p.m. wide singlet for C=C—H (1 H)
  9.2–10.2 p.p.m. wide signal for —COOH (1 H)

Rac. 3 - oxo-14-desmethyl-isocassenic acid $\beta$(dimethylamino)ethyl ester:
 M.P. 72–73° (from ether/petroleum ether)
 U.V. spectrum:
  Maximum at 223 nm. (log $\epsilon=4.25$)
  Shoulder at 295 nm. (log $\epsilon=1.40$)
 IR spectrum: Inter alia bands at 1700, 1645 cm.$^{-1}$ NMR spectrum: Inter alia signals at —
 0.97, 1.05, 1.08 p.p.m. singlets for C—$CH_3$ (9 H)
 2.30 p.p.m. singlet for $N(CH_3)_2$ (6 H)
 2.58, 4.20 p.p.m. triplets for O—$CH_2CH_2N$ (4 H)
 3.8 p.p.m. multiplet for $C_{14}$—H (1 H)
 5.62 p.p.m. wide singlet for C=C—H (1 H)

EXAMPLE 6

Separation of a mixture of racemic 3$\beta$-acetoxy-14-desmethyl-cassenic acid ethyl ester with racemic 3$\beta$-acetoxy-14-desmethyl-isocassenic acid ethyl ester A uniform crystalline product is obtained by fractional crystallization of the crude mixture of racemic 3$\beta$-acetoxy-14-desmethyl-cassenic acid ethyl ester and racemic 3$\beta$-acetoxy-14-desmethyl-isocassenic acid ethyl ester with acetone/ether. After recrystallizing from acetone racemic 3$\beta$-acetoxy-14-desmethyl-cassenic acid ethyl ester is obtained in the form of colourless leaflets having a M.P. of 138–141°.

UV spectrum: Maximum at 222.5 nm. (log $\epsilon=4.45$)
IR spectrum: Inter alia bands at 1722, 1708 and 1650 cm.$^{-1}$
NMR spectrum: Inter alia signals at—
 0.83, 0.87 p.p.m. singlets for C—$CH_3$ (3 or 6 H)
 1.27 p.p.m. triplet and 4.17 p.p.m. quadruplet for —$COOCH_2CH_3$
 2.05 p.p.m. signlet for —$OCOCH_3$ (3 H)
 3.9 p.p.m. multiplet for $C_{12}$—H (1 H)
 4.3–4.7 p.p.m. multiplet for CH—OAc (1 H)
 5.57 p.p.m. wide singlet for C=CH— (1 H )

The remaining mother liquor from the fractional crystallization is chromatographed on a 60-fold quantity of silica gel. Elution with benzene/petroleum ether (7:3) yields a colourless oil, from which colourless crystals having a M.P. of 143–145° are obtained with ether/petroleum ether. After recrystallizing once more from ether/petroleum ether racemic 3$\beta$-acetoxy-14-desmethyl-isocassenic acid ethyl ester is obtained in the form of colourless leaflets having a M.P. of 144–145°.

UV spectrum: Maximum at 223.5 nm. (log $\epsilon=4.23$)
IR spectrum: Inter alia bands at 1720, 1705 and 1645 cm.$^{-1}$
NMR spectrum: Inter alia signals at—
 0.82, 0.87 p.p.m. singlets for C—$CH_3$ (3 or 6 H)
 1.28 p.p.m. triplet and 4.17 p.p.m. quadruplet for —$COOCH_2CH_3$
 2.05 p.p.m. singlet for —$OCOCH_3$ (3 H)
 3.8 p.p.m. multiplet for $C_{14}$—H (1 H)
 4.2–4.7 p.p.m. multiplet for CH—OAc (1 H)
 5.60 p.p.m. wide shinglet for C=C—H The mixture used as starting material may be produced as follows:

(a) Mixture of racemic 3$\beta$-acetoxy-14-desmethyl-cassenic acid ethyl ester with racemic 3$\beta$-acetoxy-14-desmethyl-isocassenic acid ethyl ester.—A solution of 1.05 g. (15 millimols) of ethoxy-acetylene in 15 cc. of absolute ether is added portionwise during the course of 10 minutes, while cooling with ice and in the absence of moisture to a solution of 3.06 g. (10 millimols) of 1,4,4a,4b,5,6,7,8,8a,9,10,10a-dodecahydro-7B-acetoxy - 4b,8,8 - trimethyl-2(3H)-phenanthrone and 1.7 g. (12 millimols) of freshly distilled boron trifluoride ethyl-etherate in 50 cc. of absolute ether, at such a rate that the reaction temperature does not rise above 10°. After the addition has been completed, stirring is effected at room temperature for 45 minutes and then at the boil for 90 minutes, cooling is subsequently effected to 0°, ice water is added and extraction is effected with methylene chloride in the usual manner. The organic phase is successively washed with 20% sodium acetate solution and water, is dried over sodium sulphate and concentrated. The residue is crystallized from ether/petroleum ether, whereby a mixture of geometric isomers of racemic 3β-acetoxy-14-desmethyl-cassenic acid ethyl ester with racemic 3β-acetoxy-14-desmethyl-isocassenic acid ethyl, having a M.P. of 116–135°, is obtained. Further amounts of the compound are obtained from the mother liquor by chromatography on silica gel and elution with benzene/petroleum ether (7:3).

UV spectrum: Maximum at 223.5 nm. (log $\epsilon$=4.23)
IR spectrum: Inter alia bands at 1720, 1243 cm.$^{-1}$ (acetyl)
  1705 cm.$^{-1}$ ($\alpha,\beta$-unsaturated ester)
  1645 cm.$^{-1}$ (conjugation C=C)
NMR spectrum:
  9.82 p.p.m. singlet for C—CH$_3$ (3 H)
  8.87 p.p.m. singlet for C—CH$_3$ (6 H)
  1.28 p.p.m. triplet and 4.17 p.p.m. quadruplet for CH$_2$CH$_3$
  2.05 p.p.m. singlet for —OCOCH$_3$ (3 H )
  about 3.6–4.1 p.p.m. multiplet for C—C (1 H)
  about 4.2–4.7 p.p.m. multiplet for CH—OAc (1 H)
  560 p.p.m. singlet for C=C—H (1 H)

(b) Mixture of racemic 3β-acetoxy-14-desmethyl-cassenic acid ethyl ester with racemic 3β-acetoxy-14-desmethyl-isocassenic acid ethyl ester.—A solution of 3.5 g. (15.5 millimols) of phosphonoacetic acid triethyl ester in 50 cc. of absolute dimethylformamide is added dropwise at room temperature during the course of 60 minutes to a suspension of 375 mg. (15.5 millimols) of sodium hydride in 50 cc. of absolute dimethylformamide in the absence of moisture and while passing through a stream of nitrogen. After stirring for a further 30 minutes a solution of 3.83 g. (12.5 millimols) of 1,4,4a,4b,5,6,7,8,8a,9,10,10a-dodecahydro-4b,8,8-trimethyl-7β-acetoxy - 2(3H)-phenanthrone (trans-anti-trans) in 75 cc. of absolute dimethylformamide is added dropwise at room temperature during the course of 90 minutes to the pale yellow, clear solution. After stirring for 5 hours water is added to the reaction mixture and thorough extraction is effected with ether. The ether solution is washed 5 times with water, is dried and concentrated.

The resulting crude product is reacetylated in the usual manner with acetic anhydride/pyridine, is decomposed with 20 cc. of ice water, is concentrated in a vacuum and the residue is extracted with ether. The ether solution is washed with water, twice with ice-cold 2 N hydrochloric acid, again with water, with a saturated sodium bicarbonate solution and once more with water. The ether solution is dried, is concentrated by evaporation and the residue is recrystallized from ether/petroleum ether. The resulting mixture of racemic 3β-acetoxy-14-desmethyl-cassenic acid ethyl ester with racemic 3β-acetoxy-14-desmethyl-isocassenic acid ethyl ester has a M.P. of 120–140° and is identical in every respect with the compound obtained in accordance with Example 6a.

The starting material 1,4,4a,4b,5,6,7,8,8a, 9,10,10a-dodecahydro - 7β - acetoxy - 4b,8,8-trimethyl-2(3H)-phenanthrone (trans-anti-trans) used as starting material in Example 6a and 6b may be obtained as follows: 5.5 g. (800 millimols) of lithium are added portionwise to 2 liters of liquid ammonia in the absence of moisture, while passing through a stream of nitrogen and cooling to −50°. A solution of 24.3 g. (80 millimols) of 4,4a,4b,5, 6,7,8,8a,9,10-decahydro - 7β - acetoxy - 4b,8,8-trimethyl-2(3H)-phenanthrone (trans-anti-trans) in 500 cc. of absolute tetrahydrofuran is then immediately added at once to the dark blue solution. After stirring at −50° for 1 hour 50 g. of ammonium chloride are added and the ammonia is distilled off from the colourless reaction solution over night at room temperature. The residue is concentrated in a vacuum and extracted with methylene chloride. The organic phase is washed with 2 N sodium bicarbonate solution and water, is dried over sodium sulphate and concentrated, whereby a dark crude product results, which is reacetylated in the usual manner with acetic anhydride and pyridine. Purification is effected by chromatography on a 60-fold quantity of silica gel and elution with benzene/petroleum ether (9:1) and benzene. Crystallization from ether/petroleum ether yields colourless needles of 1,4,4a,4b,5,6,7,8,8a,9,10,10a-dodecahydro-7β - acetoxy-4b,8,8-trimethyl-2(3H)-phenanthrone having a M.P. of 122–123°.

UV spectrum: Maximum at 283 nm. (log $\epsilon$=1.32)
IR spectrum: Inter alia bands at 1725, 1715, 1242 cm.$^{-1}$
NMR spectrum:
  0.87 p.p.m. singlet for C—CH$_3$ (3 H)
  0.89 p.p.m. singlet for C—CH$_3$ (6 H)
  2.06 p.p.m. singlet for —OCOCH$_3$ (3H)
  about 4.4–4.8 p.p.m. multiplet for CH–OAc (1 H)

(c) Mixture of racemic 3β-acetoxy-14-desmethyl-cassenic acid ethyl ester with racemic 3β-acetoxy-14-desmethyl-isocassenic acid ethyl ester.—The mixture of racemic 3β-hydroxy-14-desmethyl-cassenic acid ethyl ester with racemic 3β-hydroxy-14-desmethyl-isocassenic acid ethyl ester produced in a manner analogous to that described in Example 1, production of the starting materials c, may be acetylated with acetic anhydride//pyridine, whereby a mixture of racemic 3β-acetoxy-14-desmethyl-cassenic acid ethyl ester with racemic 3β-acetoxy-14-desmethyl-isocassenic acid ethyl ester, which is identical with the compound described in b, is obtained.

EXAMPLE 7

Racemic 7-desoxo-14-desmethyl-isocassaine 4.37 g. (11.6 millimols) of racemic 3β-acetoxy-14-desmethyl-isocassenic acid ethyl ester are dissolved in 110 cc. of 2-dimethylaminoethanol, 650 mg. (11.6 millimols) of pulverized potassium hydroxide are added and the mixture is stirred at room temperature for 72 hours. The pale yellow reaction solution is then carefully concentrated in a high vacuum and the residue taken up in ether. The ether solution is washed with water and extracted thrice with ice-cooled 2 N hydrochloric acid. The aqueous-hydrochloric acid extract is made alkaline with ammonia, thoroughly extracted with methylene chloride, dried and concentrated. A yellowish oil is isolated from the hydrochloric acid extract. The compound is uniform in accordance with thin layer chromatography, the spectroscopic data agree with the assumed structure of 7-desoxo-14-desmethyl-isocassaine.

IR spectrum: Inter alia bands at 3610, 2770, 1708, 1648 cm.$^{-1}$
NMR spectrum: Inter alia signals at—
  0.79, 0.98 p.p.m. singlets for C—CH$_3$ (6 or 3 H)
  2.30 p.p.m. singlet for —N(CH$_3$)$_2$(6 H)
  2.60, 4.22 p.p.m. triplets for —OCH$_2$CH$_2$N— (2 H each)
  About 3.1–3.5 p.p.m. multiplets for —CH—OH (1 H)
  About 3.8 p.p.m. multiplet for —C$_{14}$—H (1 H)
  5.65 p.p.m. wide signal for C=C—H (1 H).

Hydrochloride: 4.1 g. of racemic 7-desoxo-14-desmethyl-isocassaine are dissolved in 70 cc. of absolute methanol and the calculated amount of hydrochloric acid in methanol is added while cooling with ice. After 30 minutes concentration is effected in a vacuum and the residue is crystallized twice from methanol/acetone, whereby colourless leaflets having a M.P. of 235–238° are obtained.

EXAMPLE 8

Racemic 7-desoxo-14-desmethyl-cassaine 4.50 g. (12 millimols) of racemic 3β-acetoxy-14-desmethyl-cassenic acid ethyl ester are dissolved in 120 cc. of 2-dimethylamino-ethanol, 670 mg. (12 millimols) of pulverized potassium hydroxide are added and the mixture is stirred at room temperature for 72 hours. The pale yellow reaction solution is then carefully concentrated in a high vacuum and the residue is taken up in ether. The ether solution is washed with water and extracted thrice with ice-cooled 2 N hydrochloric acid. The aqueous-hydrochloric acid extract is made alkaline with ammonia, is thoroughly extracted with methylene chloride, dried and concentrated. A yellow oil is obtained from the hydrochloric acid extract. After crystallizing this oil from ether colourless crystals of racemic 7-desoxo-14-desmethyl-cassaine having a M.P. of 108–111° are obtained.

EXAMPLE 8a

Racemic 7-desoxo-14-desmethyl-cassaine 0.45 g. (1.2 millimols) of racemic 3β-acetoxy-14-desmethyl-cassenic acid ethyl ester are dissolved in 12 cc. of 2-dimethylaminoethanol and 16.8 mg. (2.4 millimols) of lithium are added. After stirring for 2 days in an atmosphere of nitrogen, working up is effected in a manner analogous to that described in Example 8, whereby racemic 7-desoxo-14-desmethyl-cassaine is obtained.

EXAMPLE 9

Separation of the mixture of racemic 3-oxo-14-desmethyl-cassenic acid tert.butyl ester with racemic 3-oxo-14-desmethyl-isocassenic acid tert.butyl ester 33.0 g. of the crude mixture of the two geometric isomers of racemic 3-oxo-14-desmethyl-cassenic acid/isocassenic acid tert.butyl ester are chromatographed on a 25-fold quantity of silica gel for purification. Elution with 15 liters of petroleum ether yields small amounts of a by-product which is discarded. The mixture of isomers is obtained by further elution with about 15 liters of a mixture of petroleum ether/ether (9:1). The oily compound is dissolved in petroleum ether, the solution is concentrated to a volume of 140 cc. and is made to crystallize by allowing to stand at room temeprature. After filtering off and washing with cold petroleum ether colourless crystals having a M.P. of 128–130° are obtained.

This geometric isomer, i.e. racemic 3-oxo-14-desmethyl-cassenic acid tert.butyl ester, which is a derivative of cassenic acid, is further characterized by the following physical data:

UV spectrum:
   Maximum at 221.5 nm. (log $\epsilon$=4.28)
   Shoulder at 270 nm. (log $\epsilon$=2.40)
IR spectrum: Inter alia bands at 1700 and 1648 cm.$^{-1}$
NMR spectrum: Inter alia signals at—
   0.98, 1.05, 1.08 p.p.m. singlets for C—CH$_3$ (3 H each)
   1.47 p.p.m. singlet for C(CH$_3$)$_3$ (9 H)
   3.9 p.p.m. multiplet for C$_{12}$—H (1 H)
   5.55 p.p.m. wide signal for C=C—H (1 H).

The mother liquor remaining after separating the above compound is concentrated to 100 cc. and is first allowed to stand at room temperature and then in the cold. After filtering off and washing with cold petroleum ether colourless crystals having a M.P. of 104–106° are obtained. After recrystallizing from ether/petroleum ether the colourless needles have a M.P. of 105–107°.

This geometric isomer, racemic 3-oxo-14-desmethyl-isocassenic acid tert.butyl ester, which is a derivative of isocassenic acid, is further characterized by the following physical data:

UV spectrum:
   Maximum at 222 nm. (log $\epsilon$=4.27)
   Shoulder at 260 nm. (log $\epsilon$=2.67)
IR spectrum: Inter alia bands at 1700 and 1649 cm.$^{-1}$
NMR spectrum: Inter alia signals at—
   0.98, 1.05, 1.08 p.p.m. singlets for C=CH$_3$ (3 H each)
   1.48 p.p.m. singlet for C(CH$_3$)$_3$ (9 H)
   3.8 p.p.m. multiplet for C$_{14}$—H (1 H)
   5.56 p.p.m. wide signal for C=C—H (1 H).

Further amounts of pure compound may be isolated by chromatography of the remaining mother liquors on a 50-fold quantity of silica gel. Small amounts of impurities are removed by elution with petroleum ether and a mixture of petroleum ether/ether (95:5), whereas the pure isomer having a M.P. of 105–107° is first obtained by elution with a mixture of petroleum ether/ether (9:1), and after several mixed fractions a further amount of compound having a M.P. of 125–128° is obtained with the same eluant mixture.

The mixture of racemic 3-oxo-14-desmethyl-cassenic acid/isocassenic acid tert.butyl ester used as starting material may be produced as follows:

(a) 2,7 - dioxo-1,1,4a-trimethyl-perhydrophenanthrene (trans-anti-trans).—See Example 1a.

(b) Mixture of racemic 3-oxo-14-desmethyl-cassenic acid/isocassenic acid tert.butyl ester.—A solution of 27.5 g. (125 millimols) of O,O-diethylphosphonoacetic acid tert.butyl ester in 180 cc. of absolute dimethylformamide is added dropwise in the absence of moisture and while passing through a stream of nitrogen to a suspension of 3.0 g. (125 millimols) of sodium hydride in 180 cc. of absolute dimethylformamide at such a rate that the reaction temperature does not rise above 20°. After the addition has been completed, stirring is effected at room temperature for 30 minutes and a solution of 21.82 g. (83.6 millimols) of 2,7-dioxo-1,1,4a-trimethyl-perhydrophenanthrene (trans-anti-trans) in 300 cc. of absolute dimethylformamide is subsequently added dropwise at room temperature to the yellow, clear reaction mixture during the course of 45 minutes. After stirring at room temperature for 4 hours 100 cc. of ice water are added to the reaction product and thorough extraction is effected with ether. The organic phase is successively washed with 2 N hydrochloric acid, water, a saturated sodium bicarbonate solution and again water, is dried and concentrated. A yellow oil, containing the two geometric isomers, racemic 3-oxo-14-desmethyl-cassenic acid tert.butyl ester and racemic 3-oxo-14-desmethyl-isocassenic acid tert.butyl ester, is obtained as residue.

EXAMPLE 10

Racemic 7-desoxo-14-desmethyl-isocassaine (a) Racemic 3β-hydroxy-14-desmethyl-isocassenic acid tert.butyl ester.—142 g. (3.75 millimols) of sodium borohydride are added in 3 portions at room temperature to a solution of 1.08 g. (3 millimols) of racemic 3-oxo-14-desmethyl-isocassenic acid tert.butyl ester in 20 cc. of methanol. After stirring at room temperature for 1½ hours 10 cc. of ice water are added, concentration is effected in a vacuum and the residue is extracted with methylene chloride. The organic phase is washed with 2 N hydrochloric acid, water, a saturated sodium bicarbonate solution and again water, is dried and concentrated. The residue, racemic 3β-hydroxy-14-desmethyl-isocassenic acid tert.butyl ester, crystallizes from ether/petroleum ether in colourless prisms having a M.P. of 141–143°.

UV spectrum:
   Maximum at 221.5 nm. (log $\epsilon$=4.28)
   Shoulder at 260 nm. (log $\epsilon$=2.76)
IR spectrum: Inter alia bands at 3620, 1700, 1645 cm.$^{-1}$
NMR spectrum: Inter alia signals at—
   0.80, 0.98 p.p.m. singlets for C—CH$_3$ (6 or 3 H)
   1.48 p.p.m. singlet for —C(CH$_3$)$_3$ (9 H)
   3.25 p.p.m. multiplet for =CH—OH (1 H)
   3.8 p.p.m. multiplet for —C$_{14}$—H (1 H)
   5.52 p.p.m. wide signal for C=C—H (1 H).

(b) Racemic 7-desoxo-14-desmethyl-isocassaine.—4.0 g. (12 millimols) of racemic 3β-hydroxy-14-desmethyl-isocassenic acid tert.butyl ester are dissolved in 100 cc. of 2-(dimethylamino)ethanol, 335 cc. (6 millimols) of pulverized potassium hydroxide are added and the mixture is stirred at room temperature overnight. After concentrating the reaction solution in a high vacuum the residue is taken up in ether and the ether solution is successively washed with water, thrice with ice-cooled 2 N hydrochloric acid and again with water. The combined aqueous-hydrochloric acid extracts are made ammoniacal while cooling with ice and are thoroughly extracted with methylene chloride. After washing with water, drying and concentrating the organic phase, racemic 7-desoxo-14-desmethyl-cassaine results int he form of a colourless oil.

UV spectrum: Maximum at 223.5 nm. (log $\epsilon$=4.25)
IR spectrum: Inter alia bands at 3610, 2770, 1708, 1648 cm.$^{-1}$
NMR spectrum: Inter alia signals at—
  0.79, 0.98 p.p.m. singlets for C—CH$_3$ (6 or 3 H)
  2.30 p.p.m. singlet for N(CH$_3$)$_2$ (6 H)
  2.60, 4.22 p.p.m. triplets for —OCH$_2$CH$_2$N— (2 H each)
  About 3.1–3.5 p.p.m. multiplets for CH—OH (1 H)
  About 3.8 p.p.m. multiplet for C$_{14}$—H (1 H)
  5.65 p.p.m. wide singlet for C=C—H (1 H)

Hydrochloride: After recrystallizing twice from methanol/acetone colourless leaflets having a M.P. of 235–238° are obtained. UV spectrum: Maximum at 227 nm. (log $\epsilon$=4.26).

EXAMPLE 11

Racemic 7-desoxo-14-desmethyl-cassaine (a) Racemic 3$\beta$-hydroxy-14-desmethyl-cassenic acid tert.butyl ester.—142 mg. (3.75 millimols) of sodium borohydride are added in 3 portions at room temperature to a solution of 1.08 g. (3 millimols) of racemic 3-oxo-14-desmethyl-cassenic acid tert.butyl ester in 20 cc. of methanol. After stirring at room temperature for 1½ hours 10 cc. of ice water are added, concentration is effected in a vacuum and the residue is thoroughly extracted with methylene chloride. The organic phase is successively washed with 2 N hydrochloric acid, water, a saturated sodium bicarbonate solution and again water, is dried and concentrated. The residue, racemic 3$\beta$-hydroxy-14-desmethyl-cassenic acid tert.butyl ester, crystallizes from ether/petroleum ether in colourless crystals having a M.P. of 137–139°.

UV spectrum:
  Maximum at 222.5 nm. (log $\epsilon$=4.29)
  Shoulder at 260 nm. (log $\epsilon$=2.80)
IR spectrum: Inter alia bands at 36020, 1700, 1645 cm.$^{-1}$
NMR spectrum: Inter alia signals at—
  0.80, 0.98 p.p.m. singlets for C—CH$_3$ (6 or 3 H)
  1.47 p.p.m. singlet for —C(CH$_3$)$_3$ (9 H)
  5.52 p.p.m. wide signal for C=C—H (1 H)
  3.9 p.p.m. multiplet for C$_{12}$—H (1 H)
  5.52 p.p.m. wide signal for C=C—H (1 H)

(b) Racemic 7-desoxo-14-desmethyl-cassaine.—8.0 g. (24 millimols) of racemic 3$\beta$-hydroxy-14-desmethyl-cassenic acid tert.butyl ester are dissolved in 150 cc. of 2-dimethylamino-ethanol, 670 mg. (12 millimols) of pulverized potassium hydroxide are added and the mixture is stirred at room temperature overnight. The pale yellow reaction solution is carefully concentrated in a high vacuum and the residue is taken up in ether. The ether solution is sucessively washed with water, thrice with ice-cooled 2 N hydrochloric acid and again with water, is dried and concentrated. The aqueous-hydrochloric acid extract is made alkaline with ammonia, is thoroughly extracted with methylene chloride and the organic phase is dried and concentrated. A yellowish oil, racemic 7-desoxo-14-desmethyl-cassaine, is isolated from the hydrochloric acid extract. After crystallizing twice from acetone/ether and drying at 60° this oil yields colourless crystals having a M.P. of 112–113°.

UV spectrum: Maximum at 223.5 nm. (log $\epsilon$=4.23)
IR spectrum: Inter alia bands at 3610, 2780, 1710 and 1650 cm.$^{-1}$ NMR spectrum: Inter alia signals at—
  0.80, 0.98 p.p.m. singlets for C—CH$_3$ (6 or 3 H)
  2.30 p.p.m. singlet for —N(CH$_3$)$_2$(6 H)
  2.60, 4.20 p.p.m. triplets for —OCH$_2$CH$_2$N— (2 H each)
  About 3.0–3.5 p.p.m. multiplets for —CH—OH (1 H)
  About 3.9 p.p.m. multiplet for C$_{12}$—H (1 H)
  5.64 p.p.m. wide signal for C=C—H (1 H)

Hydrochloride: after recrystallizing twice from menthanol/acetone colourless prisms having a M.P. of 225–227° are obtained.

EXAMPLE 12

Racemic 7-desoxo-14-desmethyl-cassaine (a) Racemic 3-oxo-14-desmethyl-cassenic acid.—1 g. of racemic 3-oxo-14-desmethyl-cassenic acid tert.butyl ester is dissolved in 10 cc. of 80% trifluoroacetic acid and the mixture is allowed to stand at room temperature. After about 15 minutes the reaction mixture is poured on ice, is dissolved in 10 cc. of 80% trifluoroacetic acid and the organic phase is washed with water, dried and concentrated. The resulting residue, racemic 3-oxo-14-desmethyl-cassenic acid, crystallizes from acetone in colourless crystals having a M.P. of 218–220°.

UV spectrum:
  Maximum at 221 nm. (log $\epsilon$=4.18)
  Shoulder at 300 nm. (log $\epsilon$=1.33)
IR spectrum: Inter alia bands at 3500, 1690, 1640 cm.$^{-1}$
NMR spectrum: Inter alia signals at—
  0.98, 1.05, 1.08 p.p.m. singlets for C—CH$_3$ (9 H)
  3.9 p.p.m. multiplet for C$_{12}$—H (1 H)
  5.67 p.p.m. wide singlet for C=C—H
  9.2–10.4 p.p.m. wide signal for —COOH (1 H)

(b) Racemic 3-dehydro-7-desoxo-14-desmethyl-cassaine.—6.12 cc. (44 millimols) of triethylamine are added in the absence of moisture to a suspension of 12.16 g. (40 millimols) of racemic 3-oxo-14-desmethyl-cassenic acid in 260 cc. of absolute benzene, the clear solution is cooled with an ice bath and 3.11 cc. (44 millimols) of thionyl chloride in 40 cc. of absolute benzene are added while stirring. After stirring at room temperature for 1½ hours cooling is again effected with an ice bath and a solution of 8.96 g. (10 millimols) of $\beta$(dimethylamino) ethanol and 6.12 cc. (44 millimols) of triethylamine in 60 cc. of absolute benzene is added dropwise to the reaction mixture. After stirring at room temperature for a further 2 hours 20 cc. of ice water are added to the reaction mixture and thorough extraction is effected with 2 N hydrochloric acid. The combined aqueous-hydrochloric acid extracts are made ammoniacal while cooling with ice and are thoroughly extracted with methylene chloride. After washing with water, drying and concentrating the extract, the residue, racemic 3-dehydro-7-desoxo-14-desmethyl-cassine, crystallizes from ether/petroleum ether in colourless prisms having a M.P. of 114–116°.

UV spectrum:
  Maximum at 223.5 nm. (log $\epsilon$=4.27)
  Shoulder at 295 nm. (log $\epsilon$=1.39)
IR spectrum: Inter alia bands at 1700, 1648 cm.$^{-1}$
NMR spectrum: Inter alia signals at—
  0.97, 1.05, 1.08 p.p.m. singlets for C—CH$_3$ (9 H)
  2.30 p.p.m. singlet for N(CH$_3$)$_2$ (6 H)
  2.58, 4.20 p.p.m. triplets for O—CH$_2$CH$_2$—N (2 H each)
  3.9 p.p.m. multiplet for C$_{12}$—H (1 H)
  5.67 p.p.m. wide singlet for C=C—H (1 H)

(c) Racemic 7-desoxo-14-desmethyl-cassaine.—1.51 g. (40 millimols) of sodium borohydride are added portionwise at +5° to a solution of 12 g. (32 millimols) of racemic 3-oxo-14-desmethyl-cassenic acid $\beta$(dimethylamino)ethyl ester in 100 cc. of absolute methanol. After standing at +5° for 45 minutes a small amount of ice water is added, the methanol is removed in a vacuum and the residue is thoroughly extracted with methylene chloride. After washing the organic phase with water, drying and concentrating, the residue crystallizes from ether in colourless crystals having a M.P. of 111–113°. The spectroscopic data of this compound agree with those of the compound obtained in accordance with Example 11b.

EXAMPLE 13

Racemic 7-desoxo-14-desmethyl-isocassaine

Racemic 7-desoxo-14-desmethyl-isocassaine may be produced from racemic 3-oxo-14-desmethyl-cassenic acid tert.butyl ester, via the racemic 3-oxo-14-desmethyl-cassenic acid and racemic 3-dehydro-7-desoxo-14-desmethyl-cassaine, by a process analogous to that described in Examples 12a, 12b and 12c. The spectroscopic data of this compound agree with those of the compound obtained in accordance with Example 10b.

The corresponding intermediates are characterized by the following physical constants:

Racemic 3-oxo-14-desmethyl-isocassenic acid:
  M.P. 226° (from methylene chloride/acetone)
  UV spectrum:
    Maximum at 221 nm. (log $\epsilon$=4.17)
    Shoulder at 300 nm. (log $\epsilon$=1.26)
  IR spectrum: Inter alia bands at 3500, 1690, 1640 cm.$^{-1}$
  NMR spectrum: inter alia signals at—
    0.98, 1.05, 1.08 p.p.m. singlets for C—CH$_3$ (9 H)
    About 3.8 p.p.m. multiplet for C$_{14}$—H (1 H)
    5.65 p.p.m. wide singlet or C=C—H (1 H)
    9.2–10.2 p.p.m. wide signal for —COOH (1 H).

Racemic 3-dehydro-7-desoxo-14-desmethyl-isocassaine:
  M.P. 72–73° (from ether/petroleum ether)
  UV spectrum:
    Maximum at 223 nm. (log $\epsilon$=4.25)
    Shoulder at 295 nm. (log $\epsilon$=1.40)
  IR spectrum: Inter alia bands at 1700, 1645 cm.$^{-1}$
  NMR spectrum: Inter alia signals at—
    0.97, 1.05, 1.08 p.p.m. singlets for C—CH$_3$ (9 H)
    2.30 p.p.m. singlet for N(CH$_3$)$_2$ (6 H)
    2.58, 4.20 p.p.m. triplets for O—CH$_2$CH$_2$N (4 H)
    3.8 p.p.m. multiplet for C$_{14}$—H (1 H)
    5.68 p.p.m. wide singlet for C=C—H (1 H).

EXAMPLE 14

3 - hydroxy - 4,4,14 - desmethyl - cassenic acid β-dimethyl-aminoethyl ester (rac.). (I.M.)

(a) 3-hydroxy-4,4,14-desmethyl-cassenic acid methyl ester.—5.0 g. (14.3 millimols) of 3 acetoxy-4,4,14-desmethyl-cassenic acid ethyl ester are dissolved in 20 ml. of methanol, 0.9 g. of potassium hydroxide are added, heating is effected on a water bath for 15 minutes and the mixture is then allowed to stand at room temperature. After 2 hours the reaction mixture is taken up in methylene chloride, washed with water, dried over sodium sulphate and reduced in volume whereby a colourless oil which does not crystallize results.

(b) 3-hydroxy - 4,4,14 - desmethyl-cassenic acid β-dimethylaminoethyl ester.—6.5 g. of pretreated ion exchange resin Dowex 2–X4 and 0.8 ml. of water are added to a solution of 3.85 g. (13.1 millimols) of 3-hydroxy-4,4,14-desmethyl-cassenic acid methyl ester in 40 ml. of 2-dimethylaminoethanol. After stirring for 3 days in an atmosphere of nitrogen at room temperature, the ion exchange resin is filtered off, washing is effected with ether and the filtrate is concentrated in a vacuum. The oily residue is taken up in ether, is first washed with water and then extracted thrice with 50 ml. of ice cooled 2 N hydrochloric acid. The aqueous hydrochloric acid extract is made ammoniacal whilst cooling with ice and is exhaustively extracted with methylene chloride. After washing with water and drying over sodium sulphate concentration is effected, whereby a colourless oil is obtained.

Nuclear magnetic resonance spectrum:

0.74 and 0.78 p.p.m. singlets for C—CH$_3$ (3 H)
2.12 p.p.m. singlet for OH
2.32 p.p.m. singlet for N(CH$_3$)$_2$ (6 H)
2.61 p.p.m. triplet for N—CH$_2$— (2 H)
3.3–4.0 p.p.m. multiplets for CH—OH and C—H (2 H)
4.22 p.p.m. triplet for O—CH$_2$ (2 H)
5.68 p.p.m. singlet for CH=C—H (1 H).

Hydrochloride: The calculated amount of hydrochloric acid dissolved in ether is added to a solution of the ester in ether whilst cooling with ice and the mixture is allowed to stand. After 30 minutes the precipitate is filtered off, washed with a small amount of absolute ether and recrystallized from methanol/acetone, whereby colourless prisms, having a melting point of 218–222°, result.

EXAMPLE 15

3-hydroxy-4,4-desmethyl-14-epi-cassenic acid β-dimethyl-aminoethyl ester (rac.) (I.M.)

(a) 3-hydroxy - 4,4 - desmethyl - 14 - epi-cassenic acid methyl ester.—5.0 g. (13.8 millimols) of 3-acetoxy-4,4-desmethyl-14-epi-cassenic acid ethyl ester are dissolved in 20 ml. of methanol in the heat, 0.85 g. of potassium hydroxide are added and the mixture is allowed to stand overnight at room temperature. The reaction mixture is taken up in methylene chloride, washed with water, dried over sodium sulphate and reduced in volume, whereby a colourless oil, which crystallizes on standing for a long time, results. Recrystallization from ether/petroleum ether yields fine, colourless needles having a melting point of 57–61°.

Ultraviolet spectrum: Maximum at 223.5 m$\mu$ (log $\epsilon$=4.22).

Infrared spectrum: Inter alia bands at 3600 cm.$^{-1}$ (OH), 1710 cm.$^{-1}$ (α,β-unsat. ester), 1640 cm.$^{-1}$ (conj. C=C).

Nuclear magnetic resonance spectrum:

0.71 p.p.m. singlet for C—CH$_3$ (3 H)
1.02 p.p.m. doublet for CH—CH$_3$
1.72 p.p.m. signal for OH
3.70 p.p.m singlet for COOCH$_3$ (3 H)
About 3.3–3.9 p.p.m. multiplet for CH—OH
About 3.7–4.2 p.p.m. multiplet for C—H
5.58 p.p.m. singlet for C=C—H (1 H).

(b) 3-hydroxy-4,4-desmethyl-14-epi-cassenic acid β-dimethylaminoethyl ester.—6.5 g. of pretreated ion exchange resin Dowex 2–X4 and 0.9 ml. of water are added to a solution of 3.3 g. (10.8 millimols) of 3-hydroxy-4,4-desmethyl-14-epi-cassenic acid methyl ester in 35 ml. of 2-dimethylamino-ethanol. After stirring for 3 days in an atmosphere of nitrogen at room temperature, the ion exchange resin is filtered off, washing is effected with methylene chloride and the solution is reduced in volume. The oily residue is taken up in ether, is first washed with water and then extracted thrice with 30 ml. if ice cooled 2 N hydrochloric acid. The aqueous hydrochloric acid extract is made ammoniacal whilst cooling with ice and is exhaustively extracted with methylene chloride. After washing with water and drying over sodium sulphate concentration is effected whereby a colourless oil, which crystallizes slowly on standing, is obtained. Recrystallization from ether/petroleum ether yields colourless leaflets having a melting point of 71–73°.

Ultraviolet spectrum: Maximum at 224.5 m$\mu$ (log $\epsilon$=4.33).

Infrared spectrum: inter alia bands at 3580 cm.$^{-1}$ (OH), 2780 cm.$^{-1}$ (N—CH$_3$), 1710 cm.$^{-1}$ (α,β-unsat. ester), 1642 cm.$^{-1}$ (conj. C=C).

Nuclear magnetic resonance spectrum:
0.72 p.p.m. singlet for C—CH$_3$ (3 H)
1.02 p.p.m. doublet for CH—CH$_3$ (J=6 cps., 3 H)
1.87 p.p.m. signal for OH
2.30 p.p.m. singlet for N(CH$_3$)$_2$ (6 H)
2.60 p.p.m. triplet for N—CH$_2$— (2 H)
About 3.3–3.9 p.p.m. multiplet for CH—OH
About 3.7–4.3 p.p.m. multiplet for C—H
4.20 p.p.m. triplet for O—CH$_2$— (2 H)
5.62 p.p.m. singlet for C=C—H (1 H).

Hydrochloride: The calculated amount of a 2 N solution of hydrochloric acid in ether is added to a solution of the ester in ether whilst cooling with ice and the solution is allowed to stand. After 30 minutes the precipitate is filtered off, washed with a small amount of ether and recrystallized from methanol/acetone, whereby colourless leaflets, having a melting point of 241–242° (decomposition), result.

EXAMPLE 16

3-hydroxy-4,4-desmethyl-14-methyl-7,8-dehydro-cassenic acid β-dimethyl-aminoethyl ester (rac.)(I.M.)

(A) Production from 3-hydroxy-4,4-desmethyl-14-methyl-7,8-dehydro-cassenic acid methyl ester (a) 3 - hydroxy-4,4-desmethyl-14-methyl-7,8-dehydro-cassenic acid methyl ester.—5.0 g. (13.3 millimols) of 3 - acetoxy-4,4-desmethyl-14-methyl-7,8-dehydro-cassenic acid ethyl ester are dissolved in the heat in 15 ml. of methanol, 0.85 g. of potassium hydroxide are added and the mixture is allowed to stand at room temperature. After 4 hours the reaction mixture is taken up in methylene chloride, washed with water, dried over sodium sulphate and reduced in volume. Crystallization from ether/petroleum ether yields colourless prisms having a melting point of 80–85°.

Ultraviolet spectrum: Maximum at 222 mμ (log ε=4.22).

Infrared spectrum: Inter alia bands at 3600 cm.$^{-1}$ (OH), 1710 cm.$^{-1}$ (α,β-unsat. ester), 1650 cm.$^{-1}$ (C=C), 1632 cm.$^{-1}$ (conj.(C=C).

Nuclear magnetic resonance spectrum:

0.69, 1.26, 1.29 p.p.m. singlets for C—CH$_3$ (3 H each)
1.76 p.p.m. signal for OH
About 3.3–3.9 p.p.m. multiplets for CH—OH and C—H (2 H)
3.74 p.p.m. singlets for COOCH$_3$ (3 H)
5.66 p.p.m. multiplet for C=C—H (1 H)
5.82 p.p.m. singlet for C=C—H (1 H).

(b) 3 - hydroxy-4,4-desmethyl-14-methyl-7,8-dehydro-cassenic acid β-dimethyl-aminoethyl ester.—5 g. of pretreated ion exchange resin Dowex 2–X4 and 0.7 ml. of water are added to a solution of 2.61 g. (8.2 millimols) of 3 - hydroxy-4,4-desmethyl-14-methyl-7,8-dehydro-cassenic acid methyl ester in 30 ml. of 2-dimethylamino-ethanol. After stirring for 3 days in an atmosphere of nitrogen at room temperature, the ion exchange resin is filtered off, washing is effected with ether and the filtrate is concentrated in a vacuum. The oily residue is taken up in ether, is first washed with water and then extracted thrice, each time with 50 ml. of a 2 N tartaric acid solution. The tartaric acid extract is made ammoniacal whilst cooling with ice and is exhaustively extracted with methylene chloride. After washing with water and drying over sodium sulphate, concentration is effected whereby a colourless oil results.

Nuclear magnetic resonance spectrum:

0.68 p.p.m. singlet for C—CH$_3$ (3 H)
1.24 p.p.m. singlet for C—CH$_3$ (3 H)
1.27 p.p.m. singlet for C—CH$_3$ (3 H)
1.83 p.p.m. singlet for OH
2.28 p.p.m. singlet for N(CH$_3$)$_2$ (6 H)
2.58 p.p.m. triplet for N—CH$_2$— (2 H)
About 3.3–3.9 p.p.m. multiplets for CH—OH and C—H (2 H)
4.18 p.p.m. triplet for O—CH$_2$— (2 H)
5.55 p.p.m. multiplet for C=C—H (1 H)
5.75 p.p.m. singlet for C=C—H (1 H)

Hydrochloride: The calculated amount of a solution of hydrochloric acid in ether is added to a solution of the ester in ether whilst cooling with ice and the mixture is allowed to stand. After 30 minutes the precipitate is filtered off, washing is effected with a small amount of absolute ether and recrystallization is effected from methanol-acetone, whereby colourless leaflets, having a melting point of 207–209° (decomposition), result.

(B) Production from 3-hydroxy-4,4-desmethyl-14-methyl-7,8-dehydro-cassenic acid ethyl ester (a) 3 - hydroxy - 4,4-desmethyl-14-methyl-7,8-dehydro-cassenic acid ethyl ester.—3.5 g. (9.4 millimols) of 3-acetoxy-4,4-desmethyl-14-methyl - 7,8 - dehydro - cassenic acid ethyl ester are dissolved in 210 ml. of ethanol, 0.70 g. (12.5 millimols) of potassium hydroxide are added and the mixture is allowed to stand over night at room temperature. The reaction mixture is carefully reduced in volume and the residue taken up in methylene chloride. After washing and drying over sodium sulphate, concentration is effected whereby a colourless oil results.

Nuclear magnetic resonance spectrum:

0.70, 1.25, 1.28 p.p.m. singlets for C—CH$_3$
1.28 p.p.m. for triplet for CH$_2$—CH$_3$
2.01 p.p.m. singlet for OH
3.3–3.9 p.p.m. multiplets for C—H and CH—OH (2 H)
4.16 p.p.m. quartet for —CH$_2$—CH$_3$ (2 H)
5.59 p.p.m. multiplet for C=C—H (1 H)
5.75 p.p.m. singlet for C=C—H (1 H)

(b) 3 - hydroxy - 4,4-desmethyl-14-methyl-7,8-dehydro-cassenic acid 2-dimethylamino-ethanol.—6.5 g. of pretreated ion exchange resin Dowex 2–X4 and 0.9 ml. of water are added to a solution of 3.1 g. (9.3 millimols) of 3-hydroxy-4,4-desmethyl-7,8-dehydro-14-methyl - cassenic acid ethyl ester in 35 ml. of 2-dimethylamino-ethanol. After stirring for 3 days in an atmosphere of nitrogen at room temperature, the ion exchange resin is filtered off, washing is effected with ether and the filtrate concentrated in a vacuum. The oily residue is taken up in ether, is first washed with water and then extracted thrice, each time with 50 ml. of a 2 N tartaric acid solution. The tartaric acid extract is made ammoniacal whilst cooling with ice and is exhaustively extracted with methylene chloride. After washing with water and drying over sodium sulphate concentration is effected, whereby a colourless oil is obtained.

EXAMPLE 17

3-hydroxy-4,4-desmethyl-14-methyl-cassenic acid β-dimethyl-aminoethyl ester (rac.) (I.M.)

(a) 3 - hydroxy-4,4-desmethyl-14-methyl-cassenic acid methyl ester.—2.98 g. (7.9 millimols) of 3-acetoxy-4,4-desmethyl-14-methyl-cassenic acid ethyl ester are dissolved in 30 ml. of methanol with the addition of 10 ml. of methylene chloride, 4.0 ml. of a 2 N solution of potassium hydroxide in methanol are added and the solution is left to stand over night at room temperature. The reaction mixture is taken up in methylene chloride, washed with water, dried over sodium sulphate and concentrated, whereby a colourless oil is obtained.

(b) 3-hydroxy-4,4-desmethyl-14-methyl-cassenic acid β-dimethyl-aminoethyl ester.—5 g. of pretreated ion exchange resin Dowex 2–X4 and 0.7 ml. of water are added to a solution of 2.5 g. (7.8 millimols) of 3-hydroxy-4,4-desmethyl-14-methyl-cassenic acid methyl ester in 25 ml. of 2-dimethylamino-ethanol. After stirring for 3 days in an atmosphere of nitrogen at room temperature, the ion exchange resin is filtered off, washing is effected with methylene chloride and the filtrate is concentrated in a vacuum. The residue is taken up in ether, is first washed with water and subsequently extracted thrice with 50 ml. of a 2 N tartaric acid solution. The tartaric acid extract is made ammoniacal whilst cooling with ice and is exhaustively extracted with methylene chloride. After washing with water and drying over sodium sulphate concentration is effected. Crystallization from ether/petroleum ether yields colourless prisms having a melting point of 70–75°.

Uultraviolet spectrum: Maximum at 224 m$\mu$ (log $\epsilon$=4.24).

Infrared spectrum: inter alia bands at 3600 cm.$^{-1}$ (OH), 2760 cm.$^{-1}$ (NCH$_3$), 1710 cm.$^{-1}$ ($\alpha,\beta$-unsat. ester), 1635 cm.$^{-1}$ (conj. C=C).

Nuclear magnetic resonance spectrum:

0.72, 1.02, 1.10 p.p.m. singlets for C—CH$_3$ (3 H each)
1.89 p.p.m. signal for OH
2.34 p.p.m. singlet for N(CH$_3$)$_2$ (6 H)
2.63 p.p.m. triplet for N—CH$_2$— (2 H)
About 3.4–4.1 p.p.m. multiplets for CH—OH and C—H (2 H)
4.25 p.p.m. triplet for O—CH$_2$— (2 H)
5.79 p.p.m. singlet for C=C—H (1 H)

Hydrochloride: The calculated amount of a solution of hydrochloric acid in ether is added to a solution of the ester in ether and the mixture is allowed to stand. After 30 minutes the precipitate is filtered off, washing is effected with a small amount of absolute ether and crystallization is effected from mehanol/acetone, whereby colourless leaflets, having a melting point of 248–250° (decomposition), result.

EXAMPLE 18

3-hydroxy-4,4-desmethyl-14-methyl-8-epi-cassenic acid $\beta$-dimethyl-aminoethyl ester (rac.) (I.M.)

(a) 3-hydroxy-4,4-desmethyl-14-methyl-8-epi-cassenic acid methyl ester.—0.81 g. (2.15 millimols) of 3-acetoxy-4,4-desmethyl-14-methyl-8-epi-cassenic acid ethyl ester are dissolved in 15 ml. of methanol, 1.2 ml. of a 2 N solution of potassium hydroxide in methanol are added and the mixture is left to stand overnight at room temperature. The reaction mixture is carefully reduced in volume, the residue is taken up in methylene chloride, washed with water, dried over sodium sulphate and reduced in volume, whereby a colourless oil results.

Ultraviolet spectrum: Maximum at 223 m$\mu$ (log $\epsilon$=4.14).

Infrared specrtum: Inter alia bands at 3580 cm.$^{-1}$ (OH). 1705 cm.$^{-1}$ ($\alpha,\beta$-unsat. ester), 1635 cm.$^{-1}$ (conj. C=C).

Nuclear magnetic resonance spectrum:

0.80, 1.03, 1.06 p.p.m. singlets for C—CH$_3$ (3 H each)
1.73 p.p.m. signal for OH
3.70 p.p.m singlet for COOCH$_3$ (3 H)
565 p.p.m. singlet for C=C—H (1 H).

(b) 3-hydroxy-4,4-desmethyl-14-methyl-8-epi-cassenic acid 2-dimethyl-aminoethyl ester.—1.5 g. of pretreated ion exchange resin Dowex 2–X4 and 0.2 ml. of water are added to a solution of 0.62 g. (1.93 millimols) of 3-hydroxy-4,4-desmethyl-14-methyl-8-epi-cassenic acid methyl ester in 8 ml. of 2-dimethylamino-ethanol. After stirring for 3 days in an atmosphere of nitrogen at room temperature, the ion exchange resin is filtered off, washing is effected with ether and the filtrate is concentrated in a vacuum. The oily residue is taken up in ether, is first washed with water and then extracted thrice, each time with 10 ml. of a 2 N tartaric acid solution. The tartaric acid extract is made ammoniacal whilst cooling with ice and is extracted with methylene chloride. After washing with water and drying over sodium sulphate, concentration is effected, whereby a colourless oil results.

Ultraviolet spectrum: Maximum at 224 m$\mu$ (log $\epsilon$=4.12).

Infrared spectrum: Inter alia bands at 3630 cm.$^{-1}$ (OH), 2800 cm.$^{-1}$ (NCH$_3$), 1710 cm.$^{-1}$ ($\alpha,\beta$-unsat. ester), 1635 cm.$^{-1}$ (conj. C=C).

Nuclear magnetic resonance spectrum:

0.80, 1.03, 1.15 p.p.m. singlets for C—CH$_3$ (3 H each)
1.94 p.p.m. signal for OH
2.31 p.p.m singlet for N(CH$_3$)$_2$ (6 H)
261 p.p.m. triplet for CH$_2$—CH$_2$—N (2 H)
About 3.1–3.8 p.p.m. multiplets for C—H and CH—OH (2 H)
4.21 p.p.m. triplet for O—CH$_2$—CH$_2$—N (2 H)
5.69 p.p.m. singlet for C=C—H (1 H).

Hydrochloride: The calculated amount of a solution of hydrochloric acid in ether is added to a solution of the ester in ether whilst cooling with ice and the mixture is left to stand. After 30 minutes the precipitate is filtered off, washing is effected with a small amount of absolute ether and crystallization is effected from methanol-acetone, whereby colourless prisms, having a melting point of 220–222° (decomposition), result.

EXAMPLE 19

3-hydroxy-14-desmethyl-cassenic acid $\beta$-dimethyl-aminoethyl ester (rac.) (I.M.)

(a) 3-hydroxy-14-desmethyl-cassenic acid methyl ester.—3.5 g. (9.3 millimols) of 3-acetoxy-14-desmethyl-cassenic acid ethyl ester are dissolved in 50 ml. of methanol with the addition of 10 ml. of methylene chloride, 0.58 g. of potassium hydroxide are added and the mixture is left to stand overnight at room temperature. The reaction mixture is taken up in methylene chloride, washed with water, dried over sodium sulphate and reduced in volume, whereby a colourless oil results.

(b) 3-hydroxy-14-desmethyl-cassenic acid $\beta$-dimethyl-aminoethyl ester.—6 g. of pretreated ion exchange resin Dowex 2–X4 and 0.8 ml. of water are added to a solution of 2.84 g. (8.9 millimols) of 3-hydroxy-14-desmethyl-cassenic acid methyl ester in 30 ml. of 2-dimethylamino-ethanol. After stirring for 3 days in an atmosphere of nitrogen at room temperature, the ion exchange resin is filtered off, washing is effected with methylene chloride and the filtrate concentrated in a vacuum. The residue is taken up in ether, is first washed with water and then extracted thrice with 50 ml. of a 2 N tartaric acid solution. The tartaric acid extract is made ammoniacal whilst cooling with ice and is exhaustively extracted with methylene chloride. After washing with water and drying over sodium sulphate, concentration is effected whereby a colourless oil results.

Nuclear magnetic resonance spectrum:

0.81 (6 H), 1.00 (3 H) p.p.m. singlets for C—CH$_3$
2.33 p.p.m. singlet for N(CH$_3$)$_2$ (6 H)
2.63 p.p.m. triplet for N—CH$_2$— (2 H)
2.90 p.ppm singlet for OH (1 H)
3.1–3.5 p.p.m. multiplet for CH—OH (1 H)
3.6–4.1 p.p.m. multiplet for C—H (1 H)
4.25 p.p.m. triplet for O—CH$_2$— (2 H)
5.70 p.p.m. singlet for C=C—H (1 H).

Hydrochloride: The calculated amount of a solution of hydrochloric acid in ether is added to a solution of the ester in ether whilst cooling with ice and the mixture is left to stand. After 30 minutes the precipitate is filtered off, washing is effected with a small amount of absolute ether and recrystallization is effected from acetone whereby colourless prisms, having a melting point of 176–186°, result.

EXAMPLE 20

3-hydroxy-14-epi-cassenic acid $\beta$-dimethyl-aminoethyl ester (rac.) (I.M.)

(a) 3-hydroxy-14-epi-cassenic acid methyl ester.—3.9 g. (10 millimols) of 3-acetoxy-14-epi-cassenic acid ethyl ester are dissolved in 50 ml. of methanol, 0.067 g. of potassium hydroxide are added and the mixture is left to stand overnight at room temperature. The reaction mixture is carefully reduced in volume and the residue taken up in methylene chloride. After washing and drying over sodium sulphate, concentration is effected. Crystallization from ether/petroleum ether yields colourless prisms having a melting point of 98–103°.

Ultraviolet spectrum: Maximum at 223.5 m$\mu$ (log $\epsilon$=4.15).

Infrared spectrum: Inter alia bands at 3610 cm.$^{-1}$ (OH), 1720 cm.$^{-1}$ ($\alpha,\beta$-unsat. ester), 1645 cm.$^{-1}$ (conj. C=C).

Nuclear magnetic resonance spectrum:

0.79 (6 H), 0.99 (3 H) p.p.m. singlets for C—CH$_3$
1.04 p.p.m. doublet for CH—CH$_3$ (3 H)
About 3.0–3.4 p.p.m. multiplet for CH—OH (1 H)
About 3.7–4.2 p.p.m. multiplet for C—H (1 H)
3.71 p.p.m. singlet for COOCH$_3$ (3 H)
5.58 p.p.m. singlet for C=C—H (1 H).

(b) 3-hydroxy - 14 - epi-cassenic acid $\beta$-dimethyl-aminoethyl ester.—7 g. of pretreated ion exchange resin Dowex 2–X4 and 0.95 ml. of water are added to a solution of 3.41 g. (10.2 millimols) of 3-hydroxy-14-epi-cassenic acid methyl ester in 35 ml. of 2-dimethylamino-ethanol. After stirring for 3 days in an atmosphere of nitrogen at room temperature, the ion exchange resin is filtered off, washing is effected with methylene chloride and the filtrate is concentrated in a vacuum. The oily residue is taken up in a large quantity of ether, is first washed with water and then extracted thrice with 50 ml. of a 2 N tartaric acid solution. The tartaric acid extract is made ammoniacal whilst cooling with ice and is exhaustively extracted with methylene chloride. After washing with water and drying over sodium sulphate, concentration is effected. Crystallization from acetone/petroleum ether yields colourless leaflets having a melting point of 144–146°.

Ultraviolet spectrum: Maximum at 224 m$\mu$ (log $\epsilon$=4.20).

Infrared spectrum: Inter alia bands at 3600 cm.$^{-1}$ (OH), 2780 cm.$^{-1}$ (NCH$_3$), 1710 cm.$^{-1}$ ($\alpha,\beta$-unsat. ester), 1642 cm.$^{-1}$ (conj. C=C).

Nuclear magnetic resonance spectrum:

0.79 (6 H), 0.98 (3 H) p.p.m. singlets for C—CH$_3$
1.03 p.p.m. doublet for CH—CH$_3$ (J=6 cps.)
2.33 p.p.m. singlet for N(CH$_3$)$_2$ (6 H)
2.62 p.p.m. triplet for N—CH$_2$— (2 H)
3.1–3.5 p.p.m. multiplet for CH—OH (1 H)
3.8–4.2 p.p.m. multiplet for C—H
4.24 p.p.m. triplet for O—CH$_2$— (2 H)
5.65 p.p.m. singlet for C=C—H (1 H).

Hydrochloride: The calculated amount of a 2 N solution of hydrochloric acid in methanol is added to a solution of the ester in methanol whilst cooling with ice and the mixture is left to stand. After 30 minutes the reaction mixture is carefully reduced in volume and the residue crystallized from acetone whereby colourless needles, having a melting point of 231–233°, result.

EXAMPLE 21

3-hydroxy-7,8-dehydro-14-methyl-cassenic acid $\beta$-dimethyl-aminoethyl ester (rac.). (I.M.)

(a) 3-hydroxy-7,8-dehydro - 14 - methyl-cassenic acid methyl ester.—4.07 g. (10.1 millimols) of 3-acetoxy-7,8-dehydro-14-methyl-cassenic acid ethyl ester are dissolved in 50 ml. of methanol with the addition of 10 ml. of methylene chloride, 5.6 ml. of a 2 N solution of potassium hydroxide in methanol are added and the mixture is left to stand at room temperature. After 3 days the reaction mixture is carefully reduced in volume, the residue taken up in methylene chloride, washed with water, dried over sodium sulphate and reduced in volume. Crystallization from ether/petroleum ether yields colourless leaflets having a melting point of 108–111°.

Ultraviolet spectrum: Maximum at 221.5 m$\mu$ (log $\epsilon$=4.21).

Infrared spectrum: Inter alia bands at 3600 cm.$^{-1}$ (OH), 1710 cm.$^{-1}$ ($\alpha,\beta$-unsat. ester), 1655 cm.$^{-1}$ (C=C), 1632 cm.$^{-1}$ (conj. C=C).

Nuclear magnetic resonance spectrum:

0.77, 0.90, 1.02, 1.26 and 1.30 p.p.m. singlets for C—CH$_3$ (3 H each)
2.14 p.p.m. signal for OH
About 3.1–3.8 p.p.m. multiplets for CH—OH and C—H (2 H)
3.74 p.p.m. singlet for OCH$_3$ (3 H)
5.73 p.p.m. multiplet for C=C—H (1 H)
5.83 p.p.m. singlet for C=C—H (1 H).

(b) 3-hydroxy - 7,8 - dehydro - 14 - methyl-cassenic acid $\beta$-dimethyl-aminoethyl ester.—6 g. of pretreated ion exchange resin Dowex 2–X4 and 0.8 ml. of water are added to a solution of 3.0 g. (8.7 millimols) of 3-hydroxy-7,8 - dehydro - 14 - methyl-cassenic acid methyl ester in 30 ml. of 2-dimethylaminoethanol. After stirring for 3 days in an atmosphere of nitrogen at room temperature, the ion exchange resin is filtered off, washing is effected with ether and the filtrate is concentrated in a vacuum. The oily residue is taken up in ether, is first washed with water and then extracted thrice with 50 ml. of a 2 N tartaric acid solution. The tartaric acid extract is made ammoniacal whilst cooling with ice and is exhaustively extracted with methylene chloride. After washing with water and drying over sodium sulphate, concentration is effected and the residue crystallized from acetone, whereby colourless prisms, having a melting point of 134–136°, result.

Ultraviolet spectrum: Maximum at 222.5 m$\mu$ (log $\epsilon$=4.25).

Infrared spectrum: Inter alia bands at 3630 cm.$^{-1}$ (OH), 2770 cm.$^{-1}$ (NCH$_3$), 1710 cm.$^{-1}$ ($\alpha,\beta$-unsat. ester), 1655 cm.$^{-1}$ (C=C), 1635 cm.$^{-1}$ (conj. C=C).

Nuclear magnetic resonance spectrum:

0.76, 0.89, 1.02, 1.25 and 1.29 p.p.m. singlets for C—CH$_3$ (3 H each)
1.70 p.p.m. signal for OH
2.33 p.p.m. singlet for N(CH$_3$)$_2$ (6 H)
2.62 p.p.m. triplet for N—CH$_2$— (2 H)
3.1–3.9 p.p.m. multiplets for CH—OH and C—H (2 H)
4.24 p.p.m. triplet for O—CH$_2$— (2 H)
5.72 p.p.m. multiplet for C=C—H (1 H)
5.58 p.p.m. multiplet for C=C—H (1 H)

Hydrochloride: The calculated amount of a solution of hydrochloric acid in ether is added to a solution of the ester in ether whilst cooling with ice and the mixture is left to stand. After 30 minutes, the precipitate is filtered off, washing is effected with a small amount of absolute ether and recrystallization is effected from methanol/acetone, whereby colourless crystals, having a melting point of 178–181° (decomposition), are obtained.

EXAMPLE 22

3 - hydroxy - 14 - methyl - cassenic acid $\beta$-dimethyl-aminoethyl ester (rac.). (I.M.)

(a) 3 - hydroxy - 14 - methyl - cassenic acid methyl ester.—3.5 g. (8.7 millimols) of 3 - acetoxy-14-methyl-cassenic acid ethyl ester are dissolved in 100 ml. of methanol with the addition of 10 ml. of methylene chloride, 4.7 ml. of a 2 N solution of potassium hydroxide in methanol are added and the mixture is left to stand at room temperature. After 3 days the reaction mixture is carefully reduced in volume, the oily residue taken up in methylene chloride, washing with water, drying over sodium sulphate and concentration are effected. Crystallization from ether/petroleum ether yields colourless leaflets having a melting point of 134–136°.

Ultraviolet spectrum: Maximum at 222.5 m$\mu$ (log $\epsilon$=4.17).

Infrared spectrum: Inter alia bands at 3630 cm.$^{-1}$ (OH), 1712 cm.$^{-1}$ ($\alpha,\beta$-unsat. ester, 1635 cm.$^{-1}$ (conj. C=C).

Nuclear magnetic resonance spectrum:

0.80 (6 H), 1.01 (6 H) and 1.10 (3 H) p.p.m. singlets for C—CH$_3$
1.86 p.p.m. signal for OH
3.1–3.5 p.p.m. multiplet for CH—OH (1 H)
3.6–4.1 p.p.m. multiplet for C—H (1 H)
3.75 p.p.m. singlet for OCH$_3$ (3 H)
5.76 p.p.m. singlet for C=C—H (1 H)

(b) 3 - hydroxy-14-methyl-cassenic acid $\beta$-dimethyl-aminoethyl ester.—5 g. of pretreated ion exchange resin Dowex 2–X4 and 0.7 ml. of water are added to a solution of 2.65 g. (7.6 millimols) of 3-hydroxy-14-methyl-cassenic acid methyl ester in 25 ml. of 2-dimethylamino-ethanol. After stirring for 3 days in an atmosphere of nitrogen at room temperature, the ion exchange resin is filtered off, washing is effected with ether and concentration is effected in a vacuum. The oily residue is taken up in ether, is first washed with water and then extracted thrice with 30 ml. of ice cooled 2 N hydrochloric acid. The aqueous hydrochloric acid extract is made ammoniacal whilst cooling with ice and is exhaustively extracted with ether. After washing with water and drying over sodium sulphate, concentration is effected. Crystallization from ether yields colourless crystals having a melting point of 124–126°.

Ultraviolet spectrum: Maximum at 224 m$\mu$ (log $\epsilon$=4.19).

Infrared spectrum: Inter alia bands at 3600 cm.$^{-1}$ (OH), 2760 cm.$^{-1}$ (NCH$_3$), 1710 cm.$^{-1}$ ($\alpha,\beta$-unsat. ester), 1633 cm.$^{-1}$ (conj. C=C).

Nuclear magnetic resonance spectrum:

0.79 (6 H), 1.01 (6 H) and 1.09 (3 H) p.p.m. singlets for C—CH$_3$
2.28 p.p.m. signal for OH
2.34 p.p.m. singlet for N(CH$_3$)$_2$ (6 H)
2.63 p.p.m. triplet for N—CH$_2$— (2 H)
3.0–3.5 p.p.m. multiplet for CH—OH (1 H)
3.6–4.1 p.p.m. multiplet for C—H (1 H)
4.25 p.p.m. triplet for O—CH$_2$— (2 H)
5.78 p.p.m. singlet for C=C—H (1 H)

Hydrochloride: The calculated amount of a solution of hydrochloric acid in ether is added to a solution of the ester in ether whilst cooling with ice and the mixture is left to stand. After 30 minutes, the precipitate is filtered off, washing is effected with a small amount of absolute ether and recrystallization is effected from methanol/acetone. Melting point 245–247° (decomposition).

EXAMPLE 23

3-hydroxy-14-desmethyl-cassenic acid $\beta$-dimethyl-aminoethyl ester (rac.). (I.M.)

1.88 g. (5 millimols) of 3 - acetoxy - 14-desmethyl-cassenic acid ethyl ester are dissolved in 50 ml. of 2-di-methylamino-ethanol, 0.28 g. (5 millimols) of pulverized potassium hydroxide are added and the mixture is stirred at room temperature in an atmosphere of nitrogen. After 3 days, the reaction mixture is carefully concentrated in a vacuum, the residue is taken up in ether, is first washed with water and then extracted thrice, each time with 40 ml. of 2 N tartaric acid. The tartaric acid extract is made ammoniacal whilst cooling with ice and is exhaustively extracted with methylene chloride. After washing with water and drying over sodium sulphate, concentration is effected whereby a colourless oil results.

Nuclear magnetic resonance spectrum:

0.81 (6 H), 1.00 (3 H) p.p.m. singlets for C—CH$_3$
2.33 p.p.m. singlet for N(CH$_3$)$_2$ (6 H)
2.63 p.p.m. triplet for N—CH$_2$— (2 H)
2.90 p.p.m. singlet for OH (1 H)
3.1–3.5 p.p.m. multiplet for CH—OH (1 H)
3.6–4.1 p.p.m. multiplet for C—H (1 H)
4.25 p.p.m. triplet for O—CH$_2$— (2 H)
5.70 p.p.m. singlet for C=C—H (1 H)

EXAMPLE 24

3-hydroxy-14-desmethyl-cassenic acid $\beta$-dimethyl-aminoethyl ester (rac.). (I.M.)

3.73 g. (11.6 millimols) of 3-hydroxy-14-desmethyl-cassenic acid methyl ester are dissolved in 200 ml. of 2-dimethylamino-ethanol and 0.65 g. (11.6 millimols) of pulverized potassium hydroxide are added. After stirring for 3 days in an atmosphere of nitrogen, working up is effected in a manner analogous to that described in Example 10, whereby 3-hydroxy-14-desmethyl-cassenic acid $\beta$-dimethyl-aminoethyl ester is obtained.

EXAMPLE 25

3-hydroxy-14-desmethyl-cassenic acid $\beta$-dimethyl-aminoethyl ester (rac.). (I.M.)

0.48 g. (1.5 millimols) of 3 - hydroxy-14-desmethyl-cassenic acid methyl ester are dissolved in 30 ml. of 2-dimethylamino-ethanol and 21 mg. (3 millimols) of lithium are added. After stirring for 2 days in an atmosphere of nitrogen, working up is effected in a manner analogous to that described in Example 10, whereby 3-hydroxy-14-desmethyl - cassenic acid $\beta$ - dimethyl-aminoethyl ester is obtained.

EXAMPLE 26

3$\beta$-acetoxy-4,4,14-desmethyl-cassenic acid ethyl ester (rac.) (I.M.)

(a) 1,4,4a,4b,5,6,7,8,8a,9,10,10a - dodecahydro - 7-acetoxy-4b-methyl-2(3H)-phenanthrone.—6.9 g. (1.0 mol) of lithium are added portionwise to 2.4 litres of liquid ammonia in the absence of moisture, whilst cooling is effected to —50° and nitrogen is passed through. Subsequently a solution of 27.6 g. (0.10 mols) of 4,4a,4b, 5,6,7,8,8a,9,10-decahydro-7-acetoxy-4b - methyl - 2(3H)-phenanthrone in 700 ml. of absolute tetrahydrofuran is immediately added dropwise to the dark blue solution. After stirring at —50° for one hour 60 g. of ammonium chloride are added and the ammonia is distilled off from the colourless reaction mixture overnight at room temperature. The remaining solution is concentrated in a vacuum and the residue is extracted with methylene chloride. After washing the organic phase with a 2 N sodium bicarbonate solution and water, drying over sodium sulphate and concentrating a crude product is obtained which is reacetylated in the usual manner with acetic anhydride and pyridine.

Crystallization from acetone/ether yields a mixture of crystals which is purified by chromatography on a 60-fold quantity of silica gel. Elution with benzene and addition of 2–3% of ether yields an oil which crystallizes from acetone/ether in the form of fine prisms having a melting point of 136–137°.

Ultraviolet spectrum: Maximum at 281.5 m$\mu$ (log $\epsilon$=1.79).

Infrared spectrum: Inter alia bands at 1720, 1243 cm.$^{-1}$ (acetyl);1710 cm.$^{-1}$ (6-ring ketone).

Nuclear magnetic resonance spectrum: 0.81 p.p.m. singlet for C—CH$_3$ (3H), 2.04 p.p.m. singlet for

OCOCH$_3$ (3H), approximately 4.5–5.0 p.p.m. multiplet for

CH—OAc (1H).

(b) 3$\beta$-acetoxy-4,4,14-desmethyl-cassenic acid ethyl ester. (rac.).—A solution of 1.05 g. (15 millimols) of ethoxy-acetylene in 10 ml. of absolute ether is added portionwise during the course of 10 minutes to a solution of 2.78 g. (10 millimols) of 1,4,4a,4b,5,6,7,8,8a,9, 10,10a-dodecahydro-7-acetoxy-4b-methyl - 2(3H) - phenanthrone and 2.12 g. (15 millimols) of freshly distilled borontrifluoride-ethyl etherate in 50 ml. of absolute ether in the absence of moisture and whilst cooling with ice, at such a rate that the reaction temperature does not rise above 10°. After the addition has been completed the orange red reaction mixture is stirred at boiling temperature for 2½ hours, subsequently cooled to 0° and ice water is added thereto. The reaction mixture is extracted in the usual manner, the organic phase is consecutively washed with a 20% sodium acetate solution and water, dried over sodium sulphate and concentrated. The residue crystallizes from ether/petroleum ether in the form of colourless leaflets having a melting point of 104–107°. A further amount of material may be isolated from the mother liquor by chromatography on silica gel and elution with benzene.

Ultraviolet spectrum: Maximum at 223 mμ (log ε=4.24).

Infrared spectrum: Inter alia bands at 1722, 1246 cm.$^{-1}$ (acetyl), 1710 cm.$^{-1}$ ($\alpha,\beta$-unsaturated ester), 1646 cm.$^{-1}$ (conj. C=C).

Nuclear magnetic resonance spectrum:

0.75 p.p.m. singlet for C—CH$_3$ (3H)
1.25 p.p.m. triplet and 4.15 p.p.m. quartet for —CH$_2$CH$_3$
2.02 p.p.m. singlet for OCOCH$_3$ (3H)
Approximately 3.6–4.1 p.p.m. multiplet for C—H (1H)
Approximately 4.5–5.0 p.p.m. multiplet for CH—OAc (1H)
5.60 p.p.m. singlet for C=C—H (1H).

EXAMPLE 27

3β-acetoxy-4,4-desmethyl-14-epi-cassenic acid ethyl ester (rac.). (I.M.)

(a) 1,4,4a,4b,5,6,7,8,8a,,9,10,10a - dodecahydro-7-acetoxy-1,4b-dimethyl-2(3H)-phenanthrone.—2.42 g. (0.35 mols) of lithium are added to 1.8 litres of liquid ammonia. 40 g. (0.145 mols) of 4,4a,4b,5,6,7,8,8a,9,10-decahydro-7-acetoxy-4b-methyl-2(3H)-phenanthrone dissolved in 550 ml. of absolute tetrahydrofuran are then immediately added during the course of 5 minutes whilst stirring to the dark blue solution whilst passing through nitrogen at −40°. The reaction mixture turns colourless in a few minutes and after 15 minutes a solution of 36 ml. (0.58 mols) of methyl iodide in 90 ml. of absolute tetrahydrofuran is added dropwise thereto and the reaction mixture is stirred for a further 30 minutes at −40°. After distilling off the ammonia at room temperature overnight, 20 g. of ammonium chloride are added to the residue, the residue is concentrated in a vacuum and then taken up in methylene chloride. After washing the organic phase with water, drying over sodium sulphate and concentrating a crude product is obtained which is reacetylated in the usual manner with acetic anhydride and pyridine.

For purposes of purification chromatography is effected on a 60-fold quantity of silica gel. After crystallization from ether/petroleum ether, the benzene+0.5 to 2% ether eluates yield colourless crystals having a melting point of 93–94°.

Ultraviolet spectrum: Maximum at 284 mμ (log ε=1.35).

Infrared spectrum: Inter alia bands at 1725, 1242 cm.$^{-1}$ (acetyl), 1708 cm.$^{-1}$ (6-ring ketone).

Nuclear magnetic resonance spectrum: 0.77 p.p.m. singlet for C—CH$_3$ (3H), 0.99 p.p.m. doublet for CH—CH$_3$ (J=6 cps.; 3H), 2.02 p.p.m. singlet for OCOCH$_3$ (3H), approximately 4.6–5.1 p.p.m. multiplet for CH—OAc (1H).

(b) 3β-acetoxy-4,4-desmethyl-14-epi-cassenic acid ethyl ether (rac.).—A solution of 0.42 g. (6 millimols) of ethoxy-acetylene in 4 ml. of absolute ether is added portionwise during the course of 10 minutes to a solution of 1.17 g. (4 millimols) of 1,4,4a,4b,5,6,7,8,8a,9,10,10a-dodecahydro - 1,4b - dimethyl - 2(3H)-phenanthrone and 0.85 g. (6 millimols) of freshly distilled boron-trifluoride-ethyl etherate in 20 ml. of absolute ether in the absence of moisture and whilst cooling with ice at such a rate that the reaction temperature does not rise above 10°. After the addition has been completed stirring is effected at the boil for 2 hours and 45 minutes, the solution is subsequently cooled to 0°, ice water is added thereto and extraction is effected in the usual manner with methylene chloride. The organic phase is consecutively washed with a 20% sodium acetate solution and water, dried over sodium sulphate and concentrated. For purposes of purification the residue is chromatographed on a 60-fold quantity of silica gel. After crystallization from ether/petroleum ether the benzene eluate yields fine, colourless prisms having a melting point of 101–102°.

Ultraviolet spectrum: Maximum at 223.5 mμ (log ε=4.21).

Infrared spectrum: inter alia bands at 1720, 1240 cm.$^{-1}$ (acetyl), 1708 cm.$^{-1}$ ($\alpha,\beta$-unsaturated ester), 1640 cm.$^{-1}$ conj. C=C).

Nuclear magnetic resonance spectrum:

0.73 p.p.m. singlet for C—CH$_3$ (3 H),
1.02 p.p.m. doublet for CH—CH$_3$ (J=6.5 cps.; 3 H),
1.28 p.p.m. triplet and 4.17 p.p.m. quartet for CH$_2$CH$_3$,
2.04 p.p.m. singlet for OCOCH$_3$ (3H),
Approximately 3.8–4.2 p.p.m. multiplet for C—H (1 H),
Approximately 4.4–5.0 p.p.m. multiplet for CH—OAc (1 H),
5.58 p.p.m. singlet for C=C—H (1 H).

EXAMPLE 28

3β-acetoxy-4,4-desmethyl-7,8-dehydro-14-methyl-cassenic acid ethyl ester (rac.) (I.M.)

(a) 1,4,4a,4b,5,6,7,8,8a,9 - decahydro-7-acetoxy-1,1,4b-trimethyl-2(3H)-phenanthrone.—13.8 g. (50 millimols) of 4,4a,4b,5,6,7,8,8a,9,10 - decahydro-7-acetoxy-4b-methyl-2(3H)-phenanthrone dissolved in 150 ml. of absolute tert-butanol are added dropwise at 30° during the course of half an hour to a solution of 4.3 g. (110 millimols) of potassium in 200 ml. of absolute tert-butanol in the absence of moisture and whilst nitrogen is passed through. After stirring at 30° for 15 minutes a solution of 7.5 ml. (120 millimols) of methyl iodide in 25 ml. of absolute tert-butanol is added dropwise and the reaction mixture is stirred at 30° for a further 6 hours. For purposes of working up the tert-butanol is evaporated in a rotatory evaporator, the residue is taken up in methylene chloride and consecutively washed with a 2 N hydrochloric acid and water. After drying over sodium sulphate and concentrating, colourless prisms, having a melting point of 119–120°, are obtained from ether/petroleum ether. The mother liquor is reacetylated in the usual manner with acetic anhydride and pyridine and is chromatographed on a 30-fold quantity of silica gel for purification. Elution with benzene yields further quantities of material.

Ultraviolet spectrum: Maximum at 290 mμ (log ε=1.71).

Infrared spectrum: inter alia bands at 1722, 1242 cm.$^{-1}$ (acetyl), 1710 cm.$^{-1}$ (6-ring ketone).

Nuclear magnetic resonance spectrum:

0.77 p.p.m. singlet for C—CH$_3$ (3 H)
1.24 p.p.m. singlet for C—CH$_3$ (6 H)
2.04 p.p.m. singlet for OCOCH$_3$ (3 H)
Approx. 4.5–5.1 p.p.m. multiplet for CH—OAc (1 H).
Approx. 5.5–5.7 p.p.m. multiplet for C=C—H (1 H).

(b) 3β - acetoxy-4,4-desmethyl-7,8-dehydro-14-methyl-cassenic acid ethyl ester (rac.).—A solution of 4.7 g. (68.3 millimols) of ethoxy-acetylene in 70 ml. of ether is added portionwise during the course of 20 minutes to a solution of 20.8 g. (68.3 millimols) of 1,4,4a,4b,5,6,7, 8,8a,9 - decahydro-7-acetoxy-1,1,4b - trimethyl - 2(3H)-phenanthrone and 14.5 g. (102 millimols) of freshly distilled boron-trifluoride-ethyl etherate in 340 ml. of absolute ether, in the absence of moisture and whilst cooling with ice, at such a rate that the reaction temperature does not rise above 10°. After stirring at the boil for 45 minutes and for 90 minutes, 2.35 g. (38 millimols) of ethoxy-acetylene in 20 ml. of absolute ether are each time added dropwise. After a total of 2½ hours the reaction mixture is cooled to 0°, ice water is added and extraction is effected in the usual manner with methylene chloride. The organic phase is consecutively washed with a 20% sodium acetate solution and water, dried over sodium sulphate and concentrated. After purification over active charcoal small colourless leaflets, having a melting point of 129–131°, crystallize from the residue. By chromatography on silica gel and elution with benzene/petroleum ether (9:1) a further portion of material may be obtained from the mother liquor.

Ultraviolet spectrum: Maximum at 221 m$\mu$ (log $\epsilon$=4.25).

Infrared spectrum: Inter alia bands at 1720, 1242 cm.$^{-1}$ (acetyl), 1710 cm.$^{-1}$ ($\alpha,\beta$-unsaturated ester), 1630 cm.$^{-1}$ (conj. C=C).

Nuclear magnetic resonance spectrum:

0.71 p.p.m. singlet for C—CH$_3$ (3 H)
1.25 p.p.m. singlet for C—CH$_3$ (3 H)
1.28 p.p.m. singlet for C—CH$_3$ (3 H)
1.28 p.p.m. triplet and 4.17 p.p.m. quartet for CH$_2$CH$_3$
2.04 p.p.m. singlet for OCOCH$_3$ (3 H)
Approx. 3.3–3.8 p.p.m. multiplet for C—H (1 H)
Approx. 4.5–5.0 p.p.m. multiplet for CH—OAc (1 H)
Approx. 5.5–5.7 p.p.m. multiplet for C=C—H (1 H)
5.75 p.p.m. singlet for C=C—H (1 H).

EXAMPLE 29

3$\beta$-acetoxy-4,4-desmethyl-14-methyl-cassenic acid ethyl ester (rac.) (I.M.)

(a) 7 - acetoxy - 1,1,4b - trimethyl-perhydro-3-phenanthrol.—20 g. (65.7 millimols) of 1,4,4a,4b,5,6,7,8,8a,9-decahydro-7-acetoxy - 1,1,4b - trimethyl - 2(3H)-phenanthrone in 450 ml. of glacial acetic acid are added to 4 g. of prehydrogenated PtO$_2$·H$_2$O in 50 ml. of glacial acetic acid and hydrogenation is effected at 22°. Hydrogenation stops after 7 hours. After filtering off the catalyst the filtrate is concentrated in a vacuum, the residue is taken up in methylene chloride and washed with a 2 N sodium carbonate and water, dried over sodium sulphate and concentrated. The evaporation residue which is a mixture of material is chromatographed on 1 kg. of silica gel for purposes of separation. Careful elution with benzene/petroleum ether (9:1) yields a small amount of an isomer which crystallizes from acetone/ether in the form of fine, colourless leaflets having a melting point of 146–148°.

Nuclear magnetic resonance spectrum:

0.87 p.p.m. singlet for C—CH$_3$ (3 H)
0.96 p.p.m. singlet for C—CH$_3$ (6 H)
1.43 p.p.m. signal for —OH
2.05 p.p.m. singlet for OCOCH$_3$ (3 H)
Approx. 2.4–2.6 p.p.m. multiplet for CH—OH (1 H)
Approx. 4.5–5.0 p.p.m. multiplet for CH—OAc (1 H).

On further development of the chromatogram after a mixed zone a further isomer is obtained with the same eluant; this isomer is obtained from ether/petroleum ether in the form of fine, colourless crystals having a melting point of 113–114°.

Nuclear magnetic resonance spectrum:

0.77 p.p.m. singlet for C—CH$_3$ (6 H)
1.00 p.p.m. singlet for C—CH$_3$ (3 H)
1.45 p.p.m. signal for —OH
2.05 p.p.m. singlet for OCOCH$_3$ (3 H)
Approx. 3.0–3.4 p.p.m. multiplet for CH—OH (1 H)
Approx. 4.5–5.0 p.p.m. multiplet for CH—OAc (1 H).

(b) 1,4,4a,4b,5,6,7,8,8a,9,10,10a-dodecahydro - 7 - acetoxy-1,1,4b-trimethyl-2(3H)-phenanthrone having a melting point of 144–146°.—9.5 ml. of a 10% chromium trioxide solution in glacial acetic acid are added dropwise whilst cooling with ice to a solution of 4.0 g. (13 millimols) of 7-acetoxy-1,1,4b-trimethyl-perhydro-3-phenanthrol (melting point 113–114°) in 40 ml. of glacial acetic acid and the solution is left to stand overnight at room temperature. After the addition of a small amount of ethanol concentration is effected, the residue is taken up in methylene chloride, the solution is washed with a 2 N sodium carbonate and water, dried over sodium sulphate and evaporated. On crystallization from acetone/ether the residue yields colourless leaflets having a melting point of 144–146°.

Ultraviolet spectrum: Maximum at 287 m$\mu$ (log $\epsilon$=1.41)

Infrared spectrum: Inter alia bands at 1728, 1248 cm.$^{-1}$ (acetyl), 1705 cm.$^{-1}$ (6-ring ketone).

Nuclear magnetic resonance spectrum:

0.78 p.p.m. singlet for C—CH$_3$ (3 H)
1.05 p.p.m. singlet for C—CH$_3$ (6 H)
2.02 p.p.m. singlet for OCOCH$_3$ (3 H)
Approx. 4.5–5.0 p.p.m. multiplet for CH—OAc (1 H).

(c) 3$\beta$-acetoxy-4,4-desmethyl-14-methyl-cassenic acid ethyl ester (rac.).—A solution of 1.11 g. (15.7 millimols) of ethoxy-acetylene in 10 ml. of absolute ether is added portionwise during the course of 10 minutes to a solution of 3.22 g. (10.5 millimols) of 1,4,4a,4b,5,6,7,8,8a,9,10,10a-dodecahydro - 7 - acetoxy - 1,1,4b-trimethyl-2(3H)-phenanthrone (melting point 144–146°) and 2.23 g. (15.7 millimols) of freshly distilled boron-trifluoride-ethyl etherate in 60 ml. of absolute ether in the absence of moisture and whilst cooling with ice, at such a rate that the reaction temperature does not rise above 10°. The orange red solution is first stirred for half an hour at 0° and then at the boil.

After 1½ hours cooling is effected with an ice bath, 0.37 g. (5.3 millimols) of ethoxy-acetylene in 2 ml. of absolute ether are then added and stirring is effected at the boil for a further hour. Subsequently cooling is effected and ice water is added. The reaction mixture is extracted in the usual manner with methylene chloride, the organic phase is consecutively washed with a 20% sodium acetate solution and water, dried over sodium sulphate and concentrated.

For purposes of purification the residue is chromatographed on a 40-fold quantity of silica gel and elution is effected with benzene/petroleum ether (9:1). Recrystallization from ether/petroleum ether yields small colourless leaflets having a melting point of 120–121°.

Ultraviolet spectrum: Maximum at 222 m$\mu$ (log $\epsilon$=4.20).

Infrared spectrum: Inter alia bands at 1725, 1245 cm.$^{-1}$ (acetyl), 1710 cm.$^{-1}$ ($\alpha,\beta$-unsaturated ester), 1637 cm.$^{-1}$ (conj. C=C).

Nuclear magnetic resonance spectrum:

0.73 p.p.m. singlet for C—CH$_3$ (3 H)
1.02 p.p.m. singlet for C—CH$_3$ (3 H)
1.09 p.p.m. singlet for C—CH$_3$ (3 H)
1.28 p.p.m. triplet and 4.17 p.p.m. quartet for CH$_2$CH$_3$
2.02 p.p.m. singlet for OCOCH$_3$ (3 H)
Approx. 3.7–4.1 p.p.m. multiplet for C—H (1 H)
Approx. 4.4–5.0 p.p.m. multiplet for CH—OAc (1 H)
5.69 p.p.m. singlet for C=C—H (1 H).

EXAMPLE 30

3$\beta$-acetoxy-4,4-desmethyl-14-methyl-8-epicassenic acid ethyl ester (rac.) (I.M.)

(a) 1,4,4a,4b,5,6,7,8,8a,9,10,10a-dodecahydro - 7 - acetoxy-1,1,4b-trimethyl-2(3H)-phenanthrone.—4.9 ml. of a 10% chromium trioxide solution in glacial acetic acid are added dropwise to a solution of 2.05 g. (6.6 millimols) of 7 - acetoxy - 1,1,4b - trimethylperhydro-3-phenanthro. (melting point 146–148°) in 20 ml. of glacial acetic acid whilst cooling with ice and the solution is left to stand overnight at room temperature. After the addition of a small amount of ethanol concentration is effected, the residue is taken up in ether, consecutively washed with water, 2 N sodium carbonate and again water, dried over sodium sulphate and evaporated. The residue is crystallized from ether/petroleum ether: colourless leaflets having a melting point of 77–79°.

Ultraviolet spectrum: Maximum at 286 m$\mu$ (log $\epsilon$=1.45).

Infrared spectrum: Inter alia bands at 1725, 1248 cm.$^{-1}$ (acetyl), 1703 cm.$^{-1}$ (6-ring ketone).

Nuclear magnetic resonance spectrum:

0.90; 1.06; 1.15 p.p.m. singlets for C—CH$_3$ (3H each)
2.05 p.p.m. singlet for OCOCH$_3$ (3H)
Approx. 4.5–5.0 p.p.m. multiplet for CH—OAc (1H).

(b) 3$\beta$-acetoxy - 4,4-desmethyl-14-methyl-8-epicassenic acid ethyl ester (rac.)—0.36 g. (5.7 millimols) of ethoxy-acetylene in 3 ml. of absolute ether are added dropwise during the course of 5 minutes to a solution of 1.14 g. (3.7 millimols) of 1,4,4a,4b,5,6,7,8,8a,9,10,10a-dodecahydro-7-acetoxy - 1,1,4b-trimethyl - 2(3H) - phenanthrone (melting point 77–79°) and 0.79 g. (5.6 millimols) of freshly distilled boron-trifluoride-ethyl etherate in 25 ml. of absolute ether in the absence of moisture and whilst cooling with ice. The orange red solution is first stirred for half an hour at 0° and then at the boil.

After 1½ hours cooling is effected with an ice bath, 0.12 g. of ethoxy-acetylene in 2 ml. of absolute ether are then added and stirring is effected at reflux for a further hour. Cooling is subsequently effected and ice water is added. The reaction mixture is extracted in the usual manner with methylene chloride, the organic phase is consecutively washed with a 20% sodium acetate solution and water, dried over sodium sulphate and concentrated.

For purposes of purification the residue is chromatographed on a 60-fold quantity of silica gel and eluted with benzene/petroleum ether (8:2). Crystallization from ether/petroleum ether yields colourless crystals having a melting point of 103–104°.

Ultraviolet spectrum: Maximum at 223 m$\mu$ (log $\epsilon$=4.15).

Infrared spectrum: Inter alia bands at 1720, 1240 cm.$^{-1}$ (acetyl), 1705 cm.$^{-1}$ ($\alpha,\beta$-unsaturated ester), 1632 cm.$^{-1}$ (conj. C=C).

Nuclear magnetic resonance spectrum:

0.82 1.03, 1.17 p.p.m. singlets for C—CH$_3$ (3 H each)
1.28 p.p.m. triplet, and 4.17 p.p.m. quartet for CH$_2$CH$_3$
2.03 p.p.m. singlet for OCOCH$_3$ (3 H)
Approx. 3.2–3.7 p.p.m. multiplet for C—H (1 H)
Approx. 4.3–4.9 p.p.m. multiplet for CH—OAc (1 H)
5.65 p.p.m. singlet for C=C—H (1 H).

EXAMPLE 31

3$\beta$-acetoxy-14-epi-cassenic acid ethyl ester (rac.) (I.M.)

(a) 1,4,4a,4b,5,6,7,8,8a,9,10,10a-dodecahydro - 7 - acetoxy-1,4b,8,8-tetramethyl - 2(3H)-phenanthrone.—0.33 g. (48 millimols) of lithium are added to 250 ml. of liquid ammonia. Subsequently 6.09 g. (20 millimols) of 4,4a,4b, 5,6,7,8,8a,9,10 - decahydro - 7 - acetoxy-4b,8,8-trimethyl-2(3H)-phenanthrone dissolved in 75 ml. of absolute tetrahydrofuran are immediately added at −50° during the course of 3 minutes whilst stirring to the dark blue solution whilst nitrogen is passed through. A solution of 5 ml. (80 millimols) of methyl iodide in 15 ml. of absolute tetrahydrofuran is slowly added dropwise during the course of 15 minutes to the colourless reaction mixture and stirring is effected for a further half hour at −50°. After distilling off the ammonia at room temperature 2.5 g. of ammonium chloride are added to the residue, concentration is effected in a vacuum and extraction is effected with methylene chloride in the usual manner. After washing the organic phase with water, drying over sodium sulphate, concentrating and reacetylating the in the usual manner with acetic anhydride in pyridine a crude product is obtained which may be purified by chromatography on silica gel. Elution with benzene+0.5 to 1% ether yields colourless leaflets having a melting point of 148–150°, after crystallization from ether/petroleum ether.

Ulrtaviolet spectrum: Maximum at 284 m$\mu$ (log $\epsilon$=1.36)

Infrared spectrum: Inter alia bands at 1725, 1245 cm.$^{-1}$ (acetyl), 1710 cm.$^{-1}$ (6-ring ketone).

Nuclear magnetic resonance spectrum:

0.85 p.p.m. singlet for C—C$_3$ (3 H)
0.89 p.p.m. singlet for C—CH$_3$ (6 H)
1.01 p.p.m. doublet for CH—CH$_3$ (J=6.5 cps., 3 H)
2.06 p.p.m. singlet for OCOCH$_3$ (3 H)
Approx 4.3–4.7 p.p.m. multiplet for CH—OAc (1 H).

(b) 3$\beta$-acetoxy-15-epi-cassenic acid ethyl ester (rac.).— A solution of 0.525 g. (7.5 millimols) of ethoxy-acetylene in 6 ml. of absolute ether is added portionwise during the course of 5 minutes to a solution of 1.60 g. (5 millimols) of 1,4,4a,4b,5,6,7,8,8a,9,10,10a - dodecahydro - 7-acetoxy - 1,4b,8,8 - tetramethyl-2(3H)-phenanthrone and 1.06 g. (7.5 millimols) of freshaly distilled boron-trifluoride-ethyl etherate in 30 ml. of absolute ether in the absence of moisture and whilst cooling with ice, at such a rate that the reaction temperature does not rise above 10°. After the addition has been completed stirring at reflux is effected for 2½ hours, cooling is then effected to 0°, ice water is added to the orange red reaction mixture and extraction is effected in the usual manner with methylene chloride. The organic phase is consecutively washed with a 20% sodium acetate solution and water, dried over sodium sulphate and concentrated. Chromatography on silica gel yields fine, colourless needles having a melting point of 118–119°, after elution with benzene/petroleum ether (9:1) and crystallization from petroleum ether.

Ultraviolet spectrum: Maximum at 223 m$\mu$ (log $\epsilon$=4.21)

Infrared spectrum: Inter alia bands at 1720, 1245 cm.$^{-1}$ (acetyl), 1710 cm.$^{-1}$ ($\alpha,\beta$-unsaturated ester), 1640 cm.$^{-1}$ (conj. C=C).

Nuclear magnetic resonance spectrum:

0.88 p.p.m. singlet for C—CH$_3$ (3 H)
0.87 p.p.m. singlet for C—CH$_3$ (6 H)
1.03 p.p.m. doublet for CH—CH$_3$ (J=6.5 cps., 3 H)
1.28 p.p.m. triplet and 4.17 p.p.m. quartet for CH$_2$CH$_3$
2.06 p.p.m. singlet for OCOCH$_3$ (3 H)
Approx. 3.7–4.1 p.p.m. multiplet for C—H (1 H)
Approx. 4.3–4.7 p.p.m. multiplet for CH—OAc (1 H)
5.58 p.p.m. singlet for C=C—H (1 H).

EXAMPLE 32

3$\beta$-acetoxy-7,8-dehydro-14-methyl-cassenic acid ethyl ester (rac.) (I.M.)

(a) 1,4,4a,4b,5,6,7,8,8a,9 - decahydro - 7 - acetoxy-1,1, 4b,8,8-pentamethyl - 2(3H) - phenanthrone.—15.2 g. (50 millimols) of 4,4a,4b,5,6,7,8,8a,9,10-decahydro-7-acetoxy-4b,8,8-trimethyl-2(3H)-phenanthrone dissolved in 150 ml. of absolute tert-butanol are added dropwise at 30° to a solution of 4.3 g. (110 millimols) of potassium in 200 ml. of absolute tert-butanol in the absence of moisture and whilst nitrogen is passed through. After stirring for half an hour at 30° a solution of 7.5 ml. (120 millimols) of methyl iodide in 25 ml. of absolute tert-butanol is added dropwise and the reaction mixture is stirred for a further 6 hours at 30°. For purposes of working up the solvent is removed in rotatory evaporator, the residue is taken up in methylene chloride and consecutively washed with a 2 N hydrochloric acid and water, dried over sodium sulphate and concentrated. After reacetylation with acetic anhydride and pyridine, purification with active charcoal and crystallization from acetone/ether colourless needles, having a melting point of 108–109°, are obtained. Further quantities of material may be isolated from the mother liquor by chromatography on silica gel and elution with benzene+1% of ether.

Ultraviolet spectrum: Maximum at 290 m$\mu$ (log $\epsilon$=1.83)

Infrared spectrum: Inter alia bands at 1720, 1242 cm.$^{-1}$ (acetyl), 1705 cm.$^{-1}$ (6-ring ketone).

Nuclear magnetic resonance spectrum:

0.81 p.p.m. singlet for C—CH$_3$ (3 H)
0.88 p.p.m. singlet for C—CH$_3$ (3 H)
0.95 p.p.m. singlet for C—CH$_3$ (3 H)
1.22 p.p.m. singlet for C—CH$_3$ (6 H)
2.04 p.p.m. singlet for OCOCH$_3$ (3 H)
Approx. 4.3–4.7 p.p.m. multiplet for CH—OAc (1 H)
Approx. 5.6–5.8 p.p.m. multiplet for C=C—Hed (1 H).

(b) 3$\beta$-acetoxy - 7,8 - dehydro-14-methyl-cassenic acid ethyl ester (rac.).—A solution of 2.1 g. (30 millimols) of ethoxy-acetylene in 15 ml. of absolute ether is added during the course of 15 minutes to a solution of 6.65 g. (20 millimols) of 1,4,4a,4b,5,6,7,8,8a,9 - decahydro - 7-acetoxy-1,1,4b,8,8-pentamethyl-2(3H)-phenanthrone and 4.26 g. (30 millimols) of freshly distilled boron-trifluoride-ethyl etherate in 100 ml. of absolute ether in the absence of moisture and whilst cooling with ice at such a rate that the reaction temperature does not rise above 10°. The orange red solution is first stirred for half an hour at 0° and then at the boil.

After 1½ hours cooling is effected, 1.4 g. (20 millimols) of ethoxy-acetylene in 10 ml. of absolute ether are then added and heating is effected for a further hour at reflux. Subsequently cooling is effected to 0°, ice water is added and the reaction mixture is extracted in the usual manner with methylene chloride. The organic phase is consecutively washed with a 20% sodium acetate solution and water, dried over sodium sulphate and concentrated. Crystallization from ether/petroleum ether yields colourless prisms having a melting point of 124–126°. Further quantities of material are obtained by chromatography of the mother liquor and elution with benzene/petroleum ether (8:2).

Ultraviolet spectrum: Maximum at 221 m$\mu$ (log $\epsilon$=4.24)

Infrared spectrum: Inter alia bands at 1725, 1248 cm.$^{-1}$ (acetyl), 1710 cm.$^{-1}$ ($\alpha,\beta$-unsaturated ester), 1633 cm.$^{-1}$ (conj. C=C).

Nuclear magnetic resonance spectrum:

0.78 p.p.m. singlet for C—CH$_3$ (3 H)
0.89 p.p.m. singlet for C—CH$_3$ (3 H)
0.96 p.p.m. singlet for C—CH$_3$ (3 H)
1.25 p.p.m. singlet for C—CH$_3$ (3 H)
1.28 p.p.m. singlet for C—CH$_3$ (3 H)
1.28 p.p.m. triplet and 4.14 p.p.m. quartet for CH$_2$CH$_3$
Approx. 3.2–3.7 p.p.m. multiplet for C—H (1 H)
Approx. 4.3–4.7 p.p.m. multiplet for CH—OAc (1 H)
Approx. 5.5–5.7 p.p.m. multiplet for C=C—H (1 H)
5.72 p.p.m. singlet for C=C—H (1 H)

EXAMPLE 33

3$\beta$-acetoxy-14-methyl-cassenic acid ethyl ester (rac.). (I.M.)

(a) 1,4,4a,4b,5,6,7,8,8a,9,10,10a - dodecahydro - 7 - acetoxy - 1,1,4b,8,8 - pentamethyl - 2(3H)-phenanthrone.—10 g. (30 millimols) of 1,4,4a,4b,5,6,7,8,8a,9-decahydro-7-acetoxy - 1,1,4b,8,8 - pentamethyl-2(3H)-phenanthrone in 30 ml. of glacial acetic acid are added to 500 mg. of prehydrogenated PtO$_2$·H$_2$O and hydrogenation is effected at 24°. After 24 hours hydrogenation stops. After filtering off the catalyst the filtrate is concentrated in a vacuum, the evaporation residue is taken up in methylene chloride, washed with a 2 N sodium carbonate and water, dried over sodium sulphate and concentrated.

The residue is dissolved in 50 ml. of glacial acetic acid, 15 ml. of a 10% chromium trioxide solution in glacial acetic acid are added dropwise whilst cooling with ice and the solution is left to stand over night at room temperature. After the addition of a small amount of ethanol concentration is effected, the residue is taken up in methylene chloride, the solution is washed with a 2 N sodium carbonate and water, dried over sodium sulphate and evaporated. Crystallization from acetone/ether yields fine, colourless needles having a melting point of 162–163°.

Ultraviolet spectrum: Maximum at 288 m$\mu$ (log $\epsilon$=1.45).

Infrared spectrum: interalia bands at 1728, 1245 cm.$^{-1}$ (acetyl), 1704 cm.$^{-1}$ (6-ring ketone).

Nuclear magnetic resonance spectrum:

0.85 p.p.m. singlet for C—CH$_3$ (3 H)
0.88 p.p.m. singlet for C—CH$_3$ (6 H)
1.03 p.p.m. singlet for C—CH$_3$ (3 H)
2.05 p.p.m. singlet for OCOCH$_3$ (3 H)
Approx. 4.3–4.7 p.p.m. multiplet for CH—OAc (1 H).

(b) 3$\beta$ - acetoxy - 14 - methyl-cassenic acid ethyl ester (rac.).—A solution of 1.19 g. (17 millimols) of ethoxy-acetylene in 10 ml. of absolute ether is added during the course of 10 minutes to a solution of 3.8 g. (11.3 millimols) of 1,4,4a,4b,5,6,7,8,8a,9,10,10a - dodecahydro - 7-acetoxy - 1,1,4b,8,8 - pentamethyl - 2(3H)-phenanthrone and 2.41 g. (17 millimols) of freshly distilled boron-trifluoride-ethyl etherate in 70 ml. of absolute ether in the absence of moisture and whilst cooling with ice, at such a rate that the reaction temperature does not rise above 10°. The orange red solution is first stirred for half an hour without ice bath and subsequently at reflux temperature. After 1½ hours cooling is effected, 0.38 g. (5.7 millimols) of ethoxy-acetylene in 4 ml. of absolute ether are then added and heating at reflux is effected for a further hour. After cooling ice water is added and the reaction mixture is extracted in the usual manner with methylene chloride. The organic phase is consecutively washed with a 20% sodium acetate solution and water, dried over sodium sulphate and concentrated. Crystallization from ether/petroleum ether yields fine, colourless needles having a melting point of 153–155°. Further amounts of material may be isolated from the mother liquor by chromatography on silica gel and elution with benzene/petroleum ether (7:3).

Ultraviolet spectrum: Maximum at 223 m$\mu$ (log $\epsilon$=4.21).

Infrared spectrum: inter alia bands at 1722, 1248 cm.$^{-1}$ (acetyl), 1710 cm.$^{-1}$ ($\alpha,\beta$-unsaturated ester), 1634 cm.$^{-1}$ (conj. C=C).

Nuclear magnetic resonance spectrum:

0.80 p.p.m. singlet for C—CH$_3$ (3 H)
0.86 p.p.m. singlet for C—CH$_3$ (6 H)
1.00 p.p.m. singlet for C—CH$_3$ (3 H)
1.08 p.p.m. singlet for C—CH$_3$ (3 H)
1.28 p.p.m. triplet and 4.18 p.p.m. quartet for CH$_2$CH$_3$
2.05 p.p.m. singlet for OCOCH$_3$ (3 H)
Approx. 3.6–4.0 p.p.m. multiplet for C—H (1 H)
Approx. 4.3–4.8 p.p.m. multiplet for CH—OAc (1 H)
5.70 p.p.m. singlet for C=C—H (1 H)

What is claimed is:
1. A compound of formula:

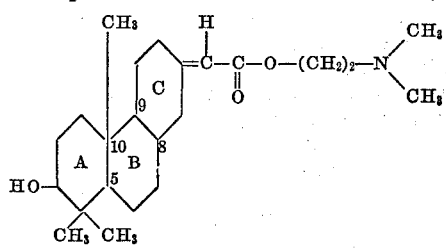

or formula:

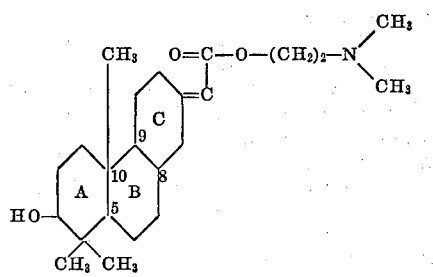

and their therapeutically acceptable acid addition salts.

2. A compound according to claim 1, which is 3β-hydroxy-14-desmethyl-cassenic acid β(dimethylamino) ethyl ester or its hydrochloride.

3. A compound according to claim 1, which is 3β-hydroxy-14-desmethyl-isocassenic acid β(dimethylamino) ethyl ester or its hydrochloride.

4. A compound of general formula:

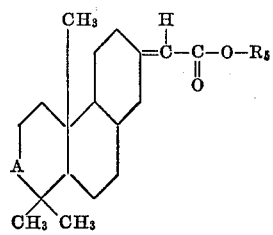

or general formula:

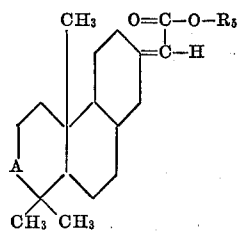

in which A is

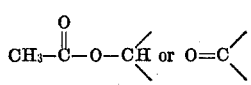

and $R_5$ is alkyl having 1 to 4 carbon atoms or phenyl or cyclohexyl.

5. A compound according to claim 4, wherein R is tert.butyl.

6. The compound according to claim 4, which is 3-oxo-14-desmethyl-cassenic acid ethyl ester.

7. The compound according to claim 4, which is 3-oxo-14-desmethyl-isocassenic acid ethyl ester.

8. The compound according to claim 4, which is 3β-acetoxy-14-desmethyl-cassenic acid ethyl ester.

9. The compound according to claim 4, which is 3β-acetoxy-14-desmethyl-isocassenic acid ethyl ester.

10. The compound according to claim 5, which is 3-oxo-14-desmethyl-cassenic acid tert.butyl ester.

11. The compound according to claim 5, which is 3-oxo-14-desmethyl-isocassenic acid tert.butyl ester.

12. A compound of general formula:

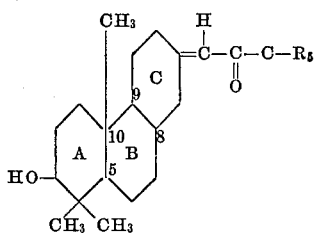

or general formula:

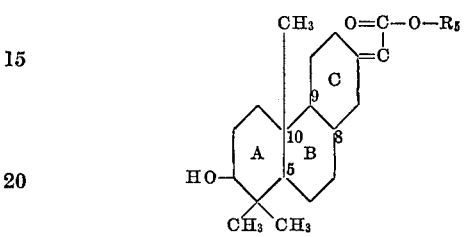

in which $R_5$ is alkyl having 1 to 4 carbon atoms or phenyl or cyclohexyl.

13. The compound according to claim 12, which is 3β-hydroxy-14-desmethyl-isocassenic acid ethyl ester.

14. The compound according to claim 12, which is 3β-hydroxy-14-desmethyl-cassenic acid ethyl ester.

15. The compound according to claim 12, which is 3β-hydroxy-14-desmethyl-isocassenic acid tert.butyl ester.

16. The compound according to claim 12, which is 3β-hydroxy-14-desmethyl-cassenic acid tert.butyl ester.

17. A mixture of two corresponding geometric isomers chosen from compounds of formula:

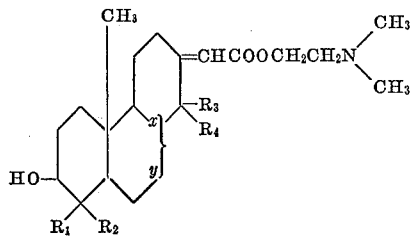

wherein each of $R_1$, $R_2$, $R_3$ and $R_4$ is hydrogen or methyl, and

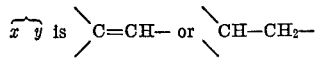

and therapeutically acceptable acid addition salts thereof.

18. A mixture according to claim 17, in which the geometric isomers thereof are 3-hydroxy-4,4,14-desmethyl-cassenic and -isocassenic acid β-dimethyl-aminoethyl ester.

19. A mixture according to claim 17, in which the geometric isomers thereof are 3-hydroxy-4,4-desmethyl-14-epi-cassenic and -isocassenic acid β-dimethyl-aminoethyl ester.

20. A mixture according to claim 17, in which the geometric isomers thereof are 3-hydroxy-4,4-desmethyl-14-methyl-7,8-dehydrocassenic and -isocassenic acid β-dimethyl-aminoethyl ester.

21. A mixture according to claim 17, in which the geometric isomers are 3-hydroxy-4,4-desmethyl-14-methyl-cassenic and -isocassenic acid β-dimethyl-aminoethyl ester.

22. A mixture according to claim 17, in which the geometric isomers thereof are 3-hydroxy-4,4-desmethyl-14-methyl-8-epi-cassenic and -isocassenic acid β-dimethyl-aminoethyl ester.

23. A mixture according to claim 17, in which the geometric isomers thereof are 3-hydroxy-14-desmethyl-cassenic and -isocassenic acid β-dimethyl-aminoethyl ester.

24. A mixture according to claim 17, in which the geometric isomers thereof are 3-hydroxy-14-epi-cassenic and -isocassenic acid β-dimethyl-aminoethyl ester.

25. A mixture according to claim 17, in which the geometric isomers thereof are 3-hydroxy-7,8-dehydro-14-methyl-cassenic and -isocassenic acid β-dimethyl-aminoethyl ester.

26. A mixture according to claim 17, in which the geometric isomers thereof are 3-hydroxy-14-methyl-cassenic and -isocassenic acid β-dimethyl-aminoethyl ester.

27. A mixture of two corresponding geometric isomers chosen from compounds of formula:

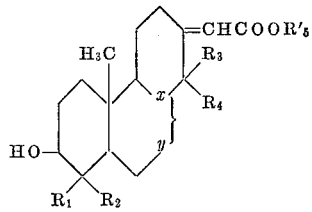

wherein each of $R_1$, $R_2$, $R_3$ and $R_4$ is hydrogen or methyl

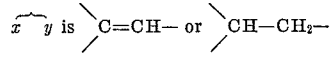

and $R_5'$ is alkyl of 1 to 4 carbon atoms.

28. A mixture according to claim 27, in which the geometric isomers thereof are 3-hydroxy-4,4,14-desmethyl-cassenic and -isocessenic acid methyl ester.

29. A mixture according to claim 27, in which the geometric isomers thereof are 3-hydroxy-4,4-desmethyl-14-epi-cassenic and -isocassenic acid methyl ester.

30. A mixture acording to claim 27, in which the geometric isomers thereof are 3-hydroxy-4,4-desmethyl-14-methyl-7,8-dehydrocassenic and -isocassenic acid methyl ester.

31. A mixture according to claim 27, in which the geometric isomers thereof are 3-hydroxy-4,4-desmethyl-14-methyl-cassenic and -isocassenic acid methyl ester.

32. A mixture according to claim 27, in which the geometric isomers thereof are 3-hydroxy-4,4-desmethyl-14-methyl-8-epi-cassenic and -isocassenic acid methyl ester.

33. A mixture according to claim 27, in which the geometric isomers thereof are 3-hydroxy-14-epi-cassenic and -isocassenic acid methyl ester.

34. A mixture according to claim 27, in which the geometric isomers thereof are 3-hydroxy-7,8-dehydro-14-methyl-cassenic and -isocassenic acid methyl ester.

35. A mixture according to claim 27, in which the geometric isomers thereof are 3-hydroxy-14-methyl-cassenic and -isocassenic acid methyl ester.

36. A mixture according to claim 27, in which the geometric isomers thereof are 3-hydroxy-14-desmethyl-cassenic and -isocassenic acid methyl ester.

37. A mixture according to claim 27, in which the geometric isomers are 3-hydroxy-4,4 - desmethyl-14-methyl-7,8-dehydro-cassenic and -isocassenic acid ethyl ester.

38. A mixture of two corresponding geometric isomers chosen from compounds of formula:

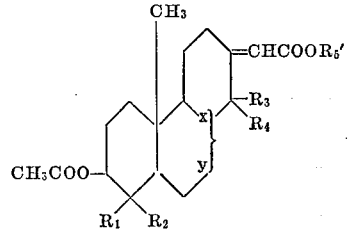

wherein each of $R_1$, $R_2$, $R_3$ and $R_4$ is hydrogen or methyl,

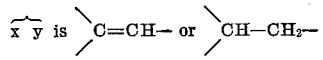

and $R_5'$ is alkyl of 1 to 4 carbon atoms.

39. A mixture according to claim 38, in which the geometric isomers thereof are 3β-acetoxy-4,4,14-desmethyl-cassenic and -isocassenic acid ethyl ester.

40. A mixture according to claim 38, in which the geometric isomers thereof are 3β-acetoxy-4,4-desmethyl-14-epi-cassenic and -isocassenic acid ethyl ester.

41. A mixture according to claim 38, in which the geometric isomers thereof are 3β-acetoxy-4,4-desmethyl-7,8-dehydro-14-methyl-cassenic and -isocassenic acid ethyl ester.

42. A mixture according to claim 38, in which the geometric isomers thereof are 3β-acetoxy-4,4-desmethyl-14-methyl-cassenic and -isocassenic acid ethyl ester.

43. A mixture according to claim 38, in which the geometric isomers thereof are 3β-acetoxy-4,4-desmethyl-14-methyl-8-epi-cassenic and -isocassenic acid ethyl ester.

44. A mixture according to claim 38, in which the geometric isomers thereof are 3β-acetoxy-14-epi-cassenic and -isocassenic acid ethyl ester.

45. A mixture according to claim 38, in which the geometric isomers thereof are 3β-acetoxy-7,8-dehydro-14-methyl-cassenic and -isocassenic acid ethyl ester.

46. A mixture according to claim 38, in which the geometric isomers thereof are 3β-acetoxy-14-methyl-cassenic and -isocassenic acid ethyl ester.

47. A mixture of two corresponding geometric isomers chosen from compounds of formula:

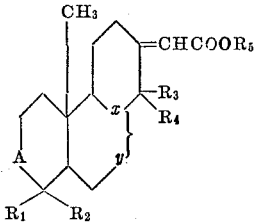

in which A is

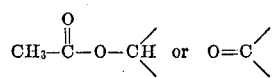

each of $R_1$, $R_2$, $R_3$ and $R_4$ is hydrogen or methyl,

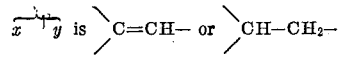

and $R_5$ is alkyl having 1 to 4 carbon atoms or phenyl or cyclohexyl.

48. A mixture of two corresponding geometric isomers chosen from compounds of formula:

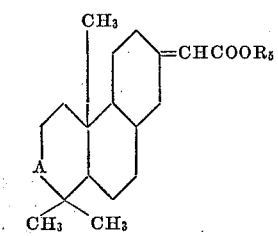

in which A is

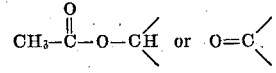

and $R_5$ is alkyl having 1 to 4 carbon atoms phenyl or cyclohexyl.

49. A mixture according to claim 48, in which the geometric isomers thereof are 3-oxo-14-desmethyl-cassenic and -isocassenic acid ethyl ester.

50. A mixture according to claim 48, in which the geometric isomers thereof are 3β-acetoxy-14-desmethyl-cassenic and -isocassenic acid ethyl ester.

51. A mixture according to claim 48, in which the geometric isomers thereof are 3-oxo-14-desmethyl-cassenic and -isocassenic acid tert. butyl ester.

References Cited

Turner et al., Tet Letters, 2, 7 (1959).

LORRAINE A. WEINBERGER, Primary Examiner

R. GERSTL, Assistant Examiner

U.S. Cl. X.R.

260—488, 514.5, 544, 586; 424—305

Disclaimer 3,553,251.—*Hartmut Hauth*, Riehen, and *Dietrich Stauffacher*, Reinach, Basel, Switzerland, ALICYCLIC COMPOUNDS. Patent dated Jan. 5, 1971. Disclaimer filed Oct. 10, 1973, by the assignee, *Sandoz Ltd. (also known as Sandoz A.G.)*.

Hereby enters this disclaimer to claims 27, 28, 29 and 47 of said patent.

[*Official Gazette August 27, 1974.*]

Disclaimer 3,553,251.—*Hartmut Hauth*, Riehen, and *Dietrich Stauffacher*, Reinach, Basel, Switzerland. ALICYCLIC COMPOUNDS. Patent dated Jan. 5, 1971. Disclaimer filed Aug. 30, 1974, by the assignee, *Sandoz Ltd.* (*also known as Sandoz AG*).

Hereby enters this disclaimer to claims 17, 18 and 19 of said patent.

[*Official Gazette October 22, 1974.*]